(12) United States Patent
Chan

(10) Patent No.: US 7,840,635 B2
(45) Date of Patent: Nov. 23, 2010

(54) METHOD AND SYSTEM FOR MONITORING PERFORMANCE OF PROCESSES ACROSS MULTIPLE ENVIRONMENTS AND SERVERS

(75) Inventor: Joseph Lim Cho Chan, Lafayette, CA (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 10/919,674

(22) Filed: Aug. 16, 2004

(65) Prior Publication Data

US 2005/0165755 A1    Jul. 28, 2005

Related U.S. Application Data

(60) Provisional application No. 60/495,566, filed on Aug. 15, 2003.

(51) Int. Cl.
   *G06F 15/16*   (2006.01)
(52) U.S. Cl. ................ 709/203; 709/223; 709/224; 719/310
(58) Field of Classification Search ............. 709/203, 709/223, 224, 226; 719/310
   See application file for complete search history.

(56) References Cited

U.S. PATENT DOCUMENTS

| | | | |
|---|---|---|---|
| 5,941,947 A | 8/1999 | Brown et al. | |
| 5,958,010 A | 9/1999 | Agarwal et al. | |
| 6,031,528 A | 2/2000 | Langfahl, Jr. | |
| 6,119,101 A | 9/2000 | Peckover | |
| 6,321,263 B1 * | 11/2001 | Luzzi et al. | 709/224 |
| 6,438,573 B1 | 8/2002 | Nilsen | |
| 6,446,028 B1 | 9/2002 | Wang | |
| 6,470,383 B1 | 10/2002 | Leshem et al. | |

(Continued)

FOREIGN PATENT DOCUMENTS

CN    1238495    12/1999

(Continued)

OTHER PUBLICATIONS

Response to Written Opinion and Request for Correction of Description of Drawings, Apr. 11, 2005, for International Application No. PCT/US04/26597, 41 pp.

(Continued)

*Primary Examiner*—Ario Etienne
*Assistant Examiner*—El Hadji M Sall
(74) *Attorney, Agent, or Firm*—Janaki K. Davda; Konrad Raynes & Victor LLP

(57) ABSTRACT

A method and system in accordance with the invention provides both real time and historical information regarding requests executed on a first server and on a second server. Applications running on two or more servers are monitored. Users are provided with information concerning requests being executed on the two or more servers, which information identifies any request that includes operations performed on more than one server. Information presented to the user includes information identifying two or more servers, processes executed or recently executed on each server in connection with a single request, and methods associated with a single request. Such information may be provided on a single display for a single request, and include information relating to two or more servers. Users may be provided with the ability to drill down to obtain more detailed information.

24 Claims, 21 Drawing Sheets

U.S. PATENT DOCUMENTS

| | | | |
|---|---|---|---|
| 6,633,908 B1 | 10/2003 | Leymann et al. | |
| 6,658,471 B1 | 12/2003 | Berry et al. | |
| 6,701,363 B1 | 3/2004 | Chiu et al. | |
| 6,711,739 B1 | 3/2004 | Kutcher | |
| 6,785,728 B1 | 8/2004 | Schneider et al. | |
| 7,127,743 B1 | 10/2006 | Khanolkar et al. | |
| 7,277,938 B2 | 10/2007 | Duimovich et al. | |
| 7,383,332 B2 | 6/2008 | Chong et al. | |
| 7,415,537 B1 | 8/2008 | Maes | |
| 2001/0034771 A1* | 10/2001 | Hutsch et al. | 709/217 |
| 2002/0038331 A1 | 3/2002 | Flavin | |
| 2002/0042896 A1 | 4/2002 | Johnson et al. | |
| 2002/0054169 A1 | 5/2002 | Richardson | |
| 2002/0054587 A1 | 5/2002 | Baker et al. | |
| 2002/0120663 A1 | 8/2002 | Binns | |
| 2002/0120727 A1 | 8/2002 | Curley et al. | |
| 2003/0004987 A1 | 1/2003 | Glanzer et al. | |
| 2003/0014464 A1 | 1/2003 | Deverill et al. | |
| 2003/0065764 A1 | 4/2003 | Capers et al. | |
| 2003/0115509 A1 | 6/2003 | Dubal | |
| 2003/0182463 A1* | 9/2003 | Valk | 709/310 |
| 2004/0054984 A1 | 3/2004 | Chong et al. | |
| 2004/0064552 A1 | 4/2004 | Chong et al. | |
| 2004/0226013 A1 | 11/2004 | Mariotti et al. | |
| 2006/0167929 A1 | 7/2006 | Chakraborty et al. | |
| 2007/0156669 A1 | 7/2007 | Marchisio et al. | |
| 2007/0294660 A1 | 12/2007 | Chong | |
| 2008/0201642 A1 | 8/2008 | Chong et al. | |

FOREIGN PATENT DOCUMENTS

| | | |
|---|---|---|
| EP | 0957432 A2 | 11/1999 |
| EP | 1134658 | 9/2001 |
| JP | 7129438 | 5/1995 |
| JP | 2000122943 | 4/2000 |
| JP | 2000222255 | 8/2000 |
| JP | 2000242530 | 9/2000 |
| JP | 2000250833 | 9/2000 |
| JP | 2000315198 | 11/2000 |
| JP | 2002041331 | 2/2002 |
| JP | 2002082926 | 3/2002 |
| JP | 2002099448 | 4/2002 |
| KR | 2001-0079612 | 8/2001 |
| WO | 9915950 | 4/1999 |
| WO | 00/08806 | 2/2000 |
| WO | WO 03 087982 | 10/2003 |

OTHER PUBLICATIONS

U.S. Appl. No. 12/235,545, filed Sep. 22, 2008, entitled "System and Computer Program for Monitoring Performance of Applications in Distributed Environment", invented by J.C. Chong, J.L. Chan, T.M. Patel, J. Heler, C.H. So, A. Tsang, R.S. Lam, R. Chow, H. Tang, J. Banks, and C.M. Zychowski, 50 pp.

U.S. Appl. No. 12/236,461, filed Sep. 23, 2008, entitled "Method, System, and Computer Program for Monitoring Performance of Applications in a Distributed Environment", invented by J.C. Chong, J.L. Chan, T.M. Patel, J. Heler, C.H. So, A. Tsang, R.S. Lam, R. Chow, J.D. Banks, C.M. Zychowski, and H. Tang, 48 pp.

PCT International Search Report, Nov. 24, 2004, for International Application No. PCT/US02/12905.

PCT International Preliminary Examination Report (IPRP), Oct. 17, 2006, for International Patent Application No. PCT/US04/26597.

PCT Notification of Transmittal of the International Search Report or the Declaration mailed Nov. 24, 2004, PCT/US03/20109, filed Jun. 23, 2003.

PCT Notification of Transmittal of International Preliminary Examination Report mailed Feb. 17, 2005, PCT/US03/20109, filed Jun. 23, 2003.

Supplementary Search Report mailed Jan. 17, 2006, PCT/US0320109.

M.A. Bauer, el al., "Reference Architecture for Distributed Systems Management", IBM Corporation, IBM Systems Journal, vol. 33, No. 3, 1994.

PCT International Search Report dated Oct. 23, 2003, for application PCT/US03/10459, filed Apr. 8, 2003.

PCT International Search Report and Written Opinion, Jun. 7, 2005, for International Application No. PCT/US04/26597.

PCT Response to Written Opinion and Request for Correction of Description of Drawings, Aug. 5, 2005, for International Application No. PCT/US04/26597.

Supplementary European Search Report, Oct. 27, 2008, for EP03718216.9, 3 pp.

Japanese First Office Action dated Mar. 25, 2008, for U.S. Appl. No. 10/409,415, 2 pp.

Japanese Second Office Action dated Aug. 1, 2008, for U.S. Appl. No. 10/409,415, 1 p.

Abstract for CN 1238495A, published Dec. 15, 1999, 1 p [Abstract for corresponding case EP0957432A2].

Abstract and Machine Translation for JP2002082926, published on Mar. 22, 2002, 36 pp.

Abstract and Machine Translation for JP7129438, published on May 19, 1995, 22 pp.

Abstract and Machine Translation for JP2002099448, published on Apr. 5, 2002, 28 pp.

Abstract and Machine Translation for JP2000122943, published on Apr. 28, 2000, 77 pp.

Abstract and Machine Translation for JP2002041331, published on Feb. 8, 2002, 8 pp.

Abstract and Machine Translation for JP2000315198, published on Nov. 14, 2000, 42 pp.

Abstract and Machine Translation for JP2000250833, published on Sep. 14, 2000, 17 pp.

Chinese Office Action and Translation, Oct. 30, 2009, for Application No. 038148773, 11 pp.

Japanese Office Action and Translation, Sep. 15, 2009, for Application No. JP2004-516267, 5 pp.

Nikkei Internet Technology, "Four Points Essential for Making Web Applications Succeed", Nikkei Internet Technologies, Nikkei Business Publications, Inc., Oct. 22, 2001, Issue 52, 10 pp [in Japanese & English Abstract].

Shirato, D., "Evaluation of Application Types, and Providing Highly Effective Responses", Nikkei Open System, Nikkei Business Publications, Inc., Mar.15, 2002, Issue 108, 10 pp [in Japanese & English Abstract].

Shirato, D., "Selecting Appropriate Functions for Performance, Operation, and Implementation Cost Requirements", Nikkei Open System, Nikkei Business Publications, Inc., Oct.15, 2001, Issue 103, 10 pp [in Japanese & English Abstract].

IDS Report, Sep. 30, 2009, from the Sep. 15, 2009 Office Action for JP2004-516267, 1 p.

Final Office Action 1, May 18, 2007, for U.S. Appl. No. 10/409,415, Total 18 pp.

Final Office Action 1, Dec. 31, 2007, for U.S. Appl. No. 10/606,028, Total 25 pp.

Final Office Action 1, Aug. 19, 2009, for U.S. Appl. No. 11/847,217, Total 12 pp.

Notice of Allowance 1, Oct. 16, 2007, for U.S. Appl. No. 10/409,415, Total 14 pp.

Notice of Allowance 1, Jun. 26, 2008, for U.S. Appl. No. 10/606,028, Total 15 pp.

Notice of Allowance 1, May 18, 2009, for U.S. Appl. No. 12/235,545, Total 28 pp.

Notice of Allowance 2, Nov. 20, 2007, for U.S. Appl. No. 10/,409,415, Total 10 pp.

Notice of Allowance 2, Dec. 2, 2008, for U.S. Appl. No. 10/606,028, Total 22 pp.

Notice of Allowance 3, Jan. 28, 2008, for U.S. Appl. No. 10/409,415, Total 10 pp.

Notice of Allowance 3, Oct. 15, 2009, for U.S. Appl. No. 10/606,028, Total 7 pp.

Notice of Allowance 4, Jan. 29, 2010, for U.S. Appl. No. 10/606,028, Total 16 pp.

Office Action 1, Dec. 7, 2006, for U.S. Appl. No. 10/409,415, Total 11 pp.

Office Action 1, Feb. 26, 2009, for U.S. Appl. No. 11/847,217, Total 24 pp.

Office Action 1, Jun. 5, 2007, for U.S. Appl. No. 10/606,028, Total 17 pp.

Office Action 3, Feb. 3, 2010, for U.S. Appl. No. 11/847,217, Total 16 pp.

Supplemental Notice of Allowance, Sep. 26, 2009, for U.S. Appl. No. 10/606,028, Total 6 pp.

Supplemental Notice of Allowance, Jun. 8, 2009, for U.S. Appl. No. 12/235,545, Total 11 pp.

English Abstract and Machine Translation for JP2000222255, published on Aug. 11, 2000, Total 16 pp.

English Abstract and Machine Translation for JP2000242530, published on Sep. 8, 2000, Total 9 pp.

IDS Report, Jun. 8, 2010, from the Jun. 1, 2010 Office Action for SVL920040552JP1, Total 1 p.

NOA 1, Jun. 1, 2010, for U.S. Appl. No. 11/847,217, Total 10 pp.

NOA5, May 18, 2010, for U.S. Appl. No. 10/606,028, Total 7 pp.

Office Action 1, Jun. 28, 2010, for U.S. Appl. No. 12/108,469, Total 43 pp.

Office Action 1, Jun. 28, 2010, for U.S. Appl. No. 12/236,461, Total 39 pp.

* cited by examiner

| Passport | CID | PID | TID | PSCID | Type | Visa |
|----------|-----|-----|-----|-------|------|------|
| 12345 | 24 | 15 | 23 | 12 | WAS | 0 |
| 12345 | 25 | 13 | 20 | 13 | CICS | 1 |
| 32356 | 24 | 15 | 24 | 12 | WAS | 0 |

FIG. 13

METHOD AND SYSTEM FOR MONITORING PERFORMANCE OF PROCESSES ACROSS MULTIPLE ENVIRONMENTS AND SERVERS

REFERENCE TO RELATED APPLICATIONS

This application claims the benefit of U.S. Provisional Patent Application Ser. No. 60/495,566, filed Aug. 15, 2003, which application is hereby incorporated by reference in its entirety.

FIELD OF THE INVENTION

This invention relates to computer software, and in particular to monitoring performance in connection with distributed computing.

BACKGROUND OF THE INVENTION

Business-critical applications, including key customer-facing applications, are carried out on servers, i.e., computer programs employing a variety of technologies, including Java J2EE technologies from Sun Microsystems. Methods and systems have been designed and implemented to monitor the behavior of servers for purposes of fault diagnosis and monitoring of efficiency of processing. However, many individual tasks are carried out on more than one server. Indeed, the different servers may employ differing operating systems and application server software. For example, a financial services transaction may involve a Java-based front end and IBM's Customer Information Control System ("CICS") based servers for executing transactions. There are numerous other examples of two and more.

Existing methods and systems can monitor a server based on a single technology, such as a Java-based server. However, those processes and systems cannot monitor and depict for the user an entire task. Existing methods and systems cannot correlate processes carried out on one server with those carried out on another. Thus, it is difficult to identify sources of problems in tasks. For example, if a process appears to be stalled on the Java server, the cause may be in the process itself, or may be because the process is functioning properly, but is awaiting data from the CICS-based server.

SUMMARY OF THE INVENTION

The invention is a method and system which provides both real time and historical information regarding requests executed on a first server and at least a second server. In the method and system, monitoring of processes includes monitoring of at least one application running on the first server and at least one application running on the second server. The first server and the second server may provide the same environment or a different environment. Users are provided with information concerning requests being executed on at least two of the servers, which information identifies any request that includes operations performed on more than one server. Information as to a single request processed on two or more servers is correlated. Information presented to the user includes information identifying the servers, those operations currently being executed or historically executed on each server in connection with a single request, and methods associated with a single request. Such information may be provided on a single display for a single request, and include information relating to two or more servers. Users may be provided with the ability to drill down to obtain more detailed information.

The invention is also a system which provides both real time and historical information regarding requests executed on more than one server. In a system of the invention, means are provided for monitoring of at least one application running on a first server and means for monitoring of at least one application running on a second server. The system has means for providing information concerning a request being executed on at least one of said first and second server, and for identifying a request which is executed on both of the first server and the second server. The system has means for correlating information as to a single request processed on two or more servers; means for presenting to the user information identifying the servers, those operations currently being executed or historically executed on each server in connection with a single request, and methods associated with a single request. The system may have means for providing such information on a single display for a single request, and means for displaying information relating to two or more servers. Means may be provided to permit users to drill down to obtain more detailed information.

The invention is also a computer program for providing information regarding at least one request executed on a first server and a second server. The program consists of instructions stored on a medium, which instructions, when executed on a processor, cause the processor to execute the steps of monitoring of at least one application running on the first server and at least one application running on said second server, identifying at least one request executed on both the first server and the second servers; and displaying information concerning the identified request.

BRIEF DESCRIPTION OF THE FIGURES

FIG. 13 is an example of a table containing information regarding transactions executed by two or more servers.

DETAILED DESCRIPTION

The invention is a method and system which provides both real time and historical information regarding requests executed on more than one server. In the method and system, monitoring of processes includes monitoring of applications running on two or more servers. The method provides a user with information concerning requests being executed on the two or more servers, which information identifies any request that includes operations performed on more than one server. Information as to a single request processed on two or more servers is correlated. Information presented to the user includes information identifying two or more servers, processes executed or recently executed on each server in connection with a single request, and methods associated with a single request. Such information may be provided on a single display for a single task, and include information relating to two or more servers. Users may be provided with the ability to drill down to obtain more detailed information.

Figure 1:
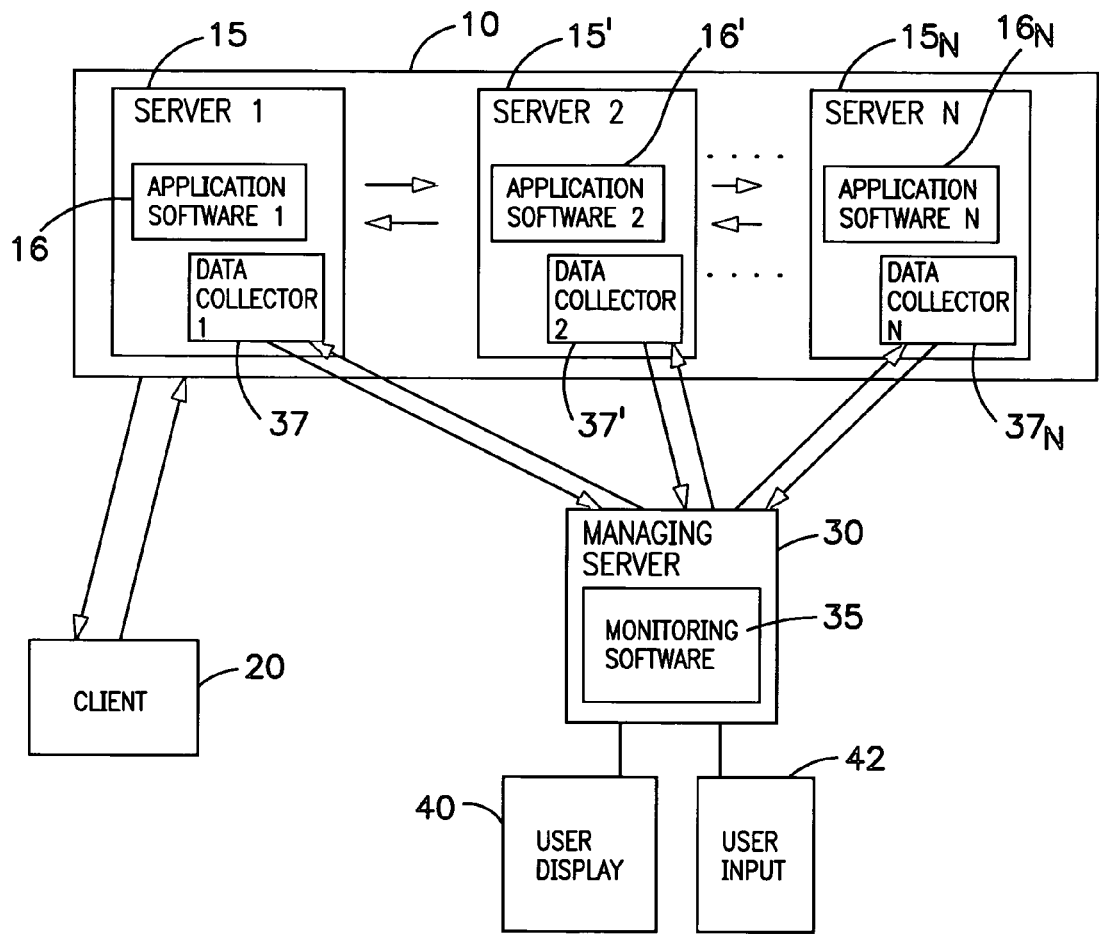
FIG. 1 is a block diagram illustrating components of the invention applied on a system.

Referring to FIG. 1, the invention will be described as applied to a computer system. The invention is used in connection with a computer system 10 which includes a first server (server 1) 15 which is in communication with a client computer 20. Client computer 20 may be connected via the Internet or other communications network to first server 15. Server 15 is a server having one or more processors, operating system software, and application software 1 16. System 10 also includes at least second server 2 15', and up to N servers, up to 15 sub N. Second server 15' has application software 2 16', which may be the same as or different from application software 1 16, and server N 15N has application software N 16N. A managing server 30 performs various monitoring and management functions by use of monitoring software 35 running on managing server 30. Each of the servers 15, 15', . . . 15N has a data collector program 37, 37', . . . 37N, which collects data for monitoring software 35, running on the server. Data collector program 37, 37', . . . 37N provides information regarding applications running on servers 15, 15', . . . 15N to monitoring software 35.

Managing server 30 has user display 40, which may be a screen display of any suitable type, and user input 42, which may be a keyboard, mouse, or other suitable user input device. Monitoring software 35 displays, on user display 40, information concerning requests being executed on system 10.

Figure 2A:
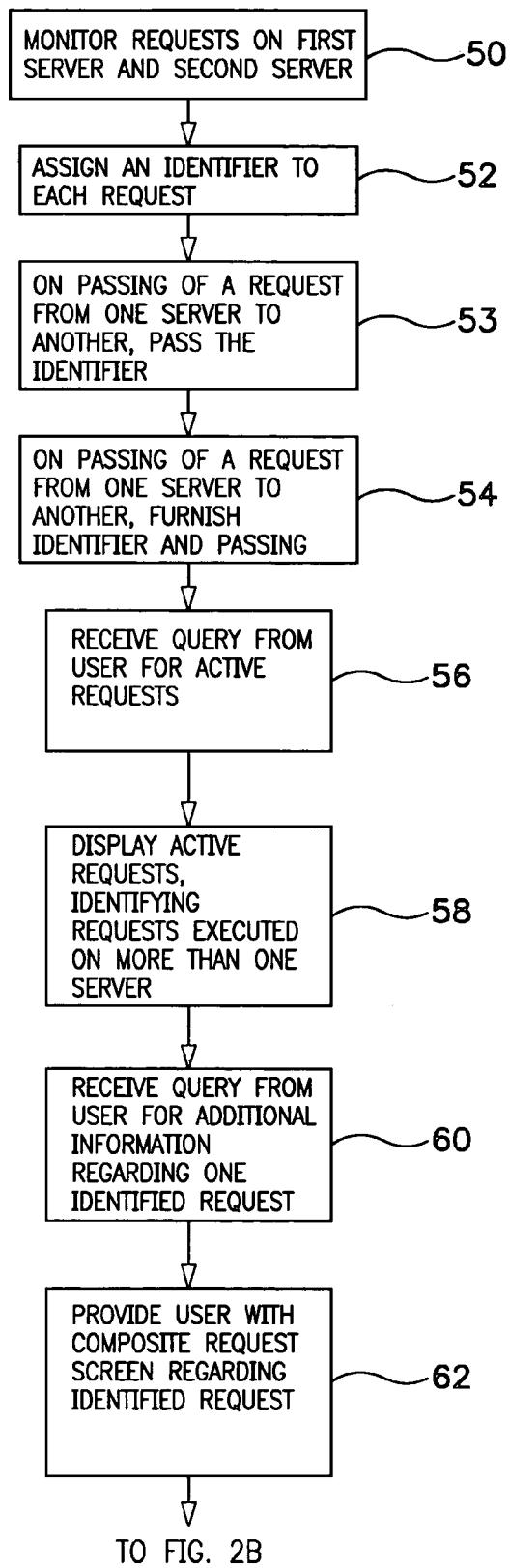
FIGS. 2A and 2B are a flow diagram illustrating a high-level process flow.
Figure 2B:
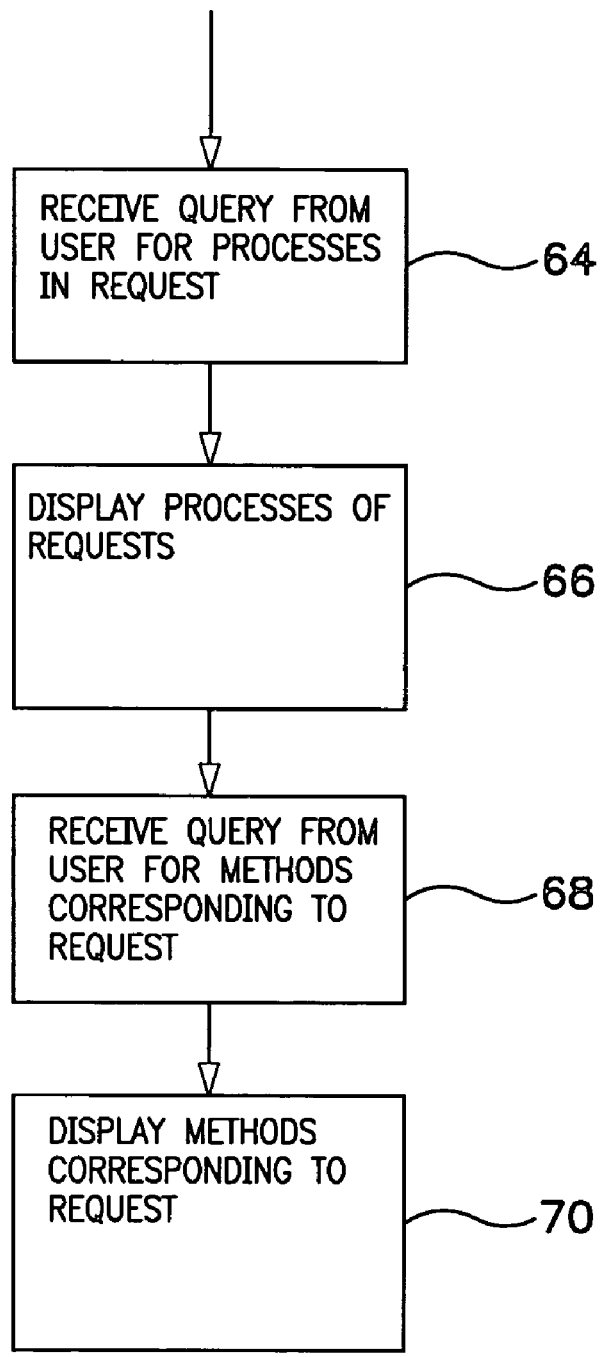

In FIGS. 2A and 2B, a simple flow diagram is provided to illustrate the M method of the invention at a high level. In step 50, requests being executed on two or more servers are monitored. This is carried out by the data collectors 37, 37', . . . 37N and monitoring software 35. Each request is assigned an identifier, as indicated at block 52. As requests are passed from one server to another, the identifier is also passed, as indicated at block 53. As requests are passed from one server to another, the fact of the passing of the request, along with the identifier, is provided by the data collector 37, 37', . . . 37N to the monitoring software 35, as indicated at block 54. A user, through monitoring software 35, queries the software for a listing of requests. The query is received, as indicated at block 56. The query in this example is for all currently active requests, but the query may be, for example, for historical requests meeting certain parameters, by way of example. The monitoring software 35 displays for the user the active requests, identifying those requests that are executed on more than one server, as indicated at block 58. The user may drill down through a series of levels of detail to obtain additional information relating to one of the displayed requests. The user may query the software for additional information regarding a selected one of the displayed requests. As indicated at block 60, such a query is received. The software displays the composite request screen for the request, as indicated at block 62. The user may query the monitoring software for a listing of processes corresponding to the request, as indicated at block 64 (FIG. 2B). The software displays this information, as indicated at block 66. The user may query the monitoring software 35 for additional detail in the form of a composite method trace. A query for a listing of methods is received, as indicated at block 68. At block 70, the listing of methods is displayed.

The invention includes a method for providing information relating to the processing of requests, where the processing of requests occurs on more than one server. The multiple servers may include more than one environment. The term "request" is used to include the terms transaction or process, and generally refers to a request made by a client for a one server to take an action. The term "environment" refers to the application software which is processing the request. Examples of environments are WebSphere and CICS. A single request may involve processing taking place on more than one server. It may be that all of the servers are using a single environment, such as technology based on the Java programming language, such as on WebSphere. Alternatively, some of the servers may be a different environment, such as a different application server, such as CICS.

The method, system and software of the present invention may be used as a component of a larger system, such as that described in published U.S. Patent Applications Publication Nos. US-2004-0054984-A1 and US-2004-0064552-A1. These applications are incorporated by reference herein.

Software in accordance with the present invention may provide an identifier, such as a numeric identifier, to each request. Preferably, each request is assigned a unique identifier. This identifier is passed by the data collector software when a request is passed between servers. The data collector software also furnishes the identifier to the managing software, so that the managing server can correlate information received from different servers. Requests that move across servers are tracked and identified as such. In the present example, a component of the managing software, called the global publish server, is responsible for maintaining information regarding active requests executed on more than one server.

The following screen shots are merely examples of the types of displays, and alternative arrangements of information may be employed within the scope and spirit of the invention. It will be appreciated that information regarding all active processes running on more than one server can be shown on a single display. The display may be a single page provided by a web server or by other suitable display software. Similarly, with respect to each additional level of detail, all of the information may be provided on a single display, which may be a single page provided by a web server or other suitable display software.

Figure 3:
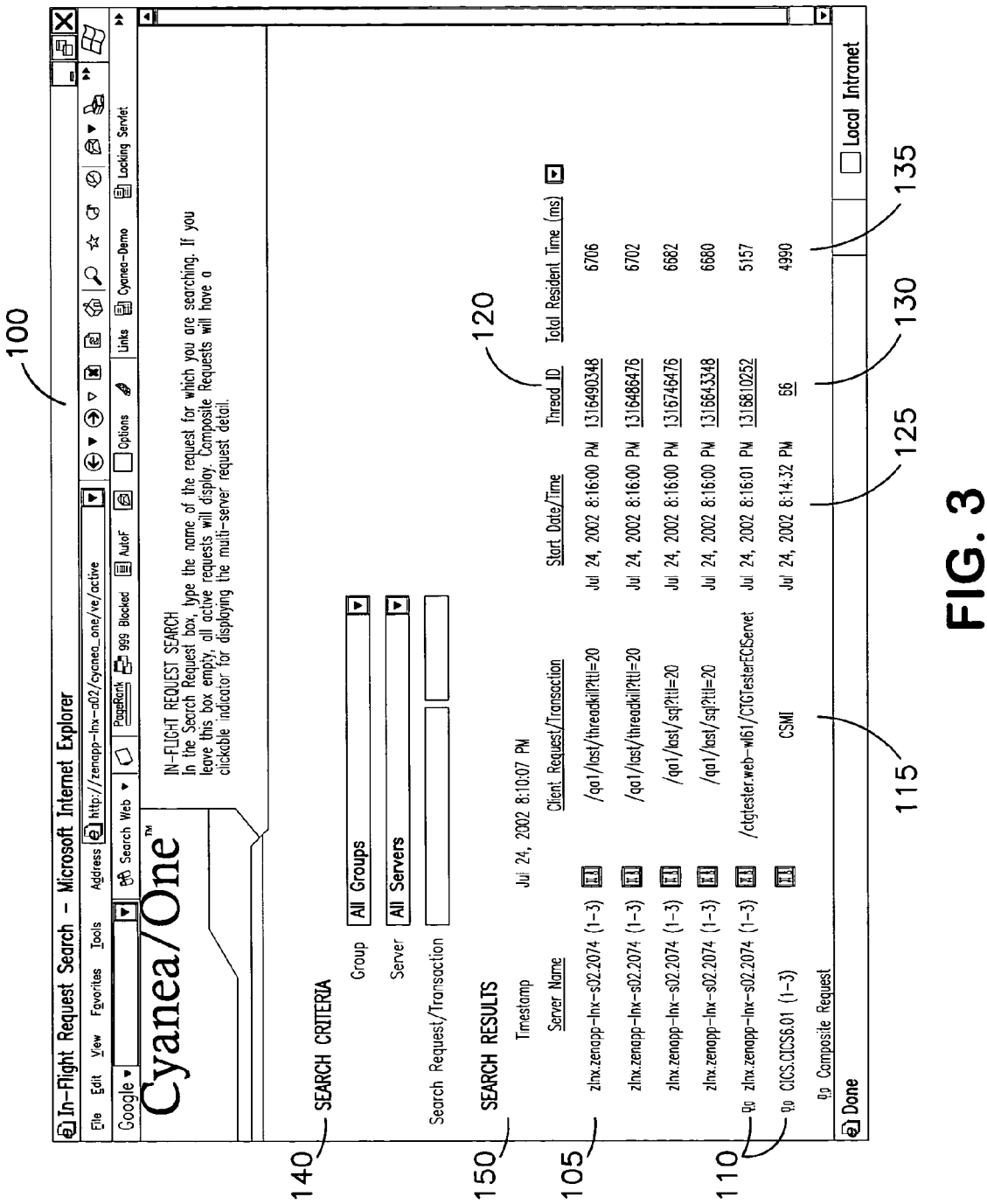
FIG. 3 is a screen shot illustrating a display for a user of all active requests running in a system employing two or more servers.

An example of a display of requests, which may be displayed in the step shown at block 58 of FIG. 2A, is shown, for example, at FIG. 3. FIG. 3 shows a display 100, which displays the results of a search sought by a user for all active requests. This may also be called an "in-flight search." Other criteria may be employed for a search, as indicated by the menus permitting selection of individual servers, individual groups of servers, and particular requests, shown in the search criteria portion 140. The "Search Results" portion 150 of the display identifies certain information regarding all identified active requests. The left hand column 105, labeled "Server Name", identifies the name of one server on which the request is being executed. In column 105, a designation 110 is provided for requests that are executed in more than one server. As may be seen in this example, a CICS server is included among the servers that are being monitored. Additional information furnished includes an identification 115 of the request, the start date and time 125 of the request, a thread ID 130, and a total resident time 135. The user may drill down into individual listed requests for additional detail, for example by mouse clicking on the thread ID in column 120.

Figure 4:
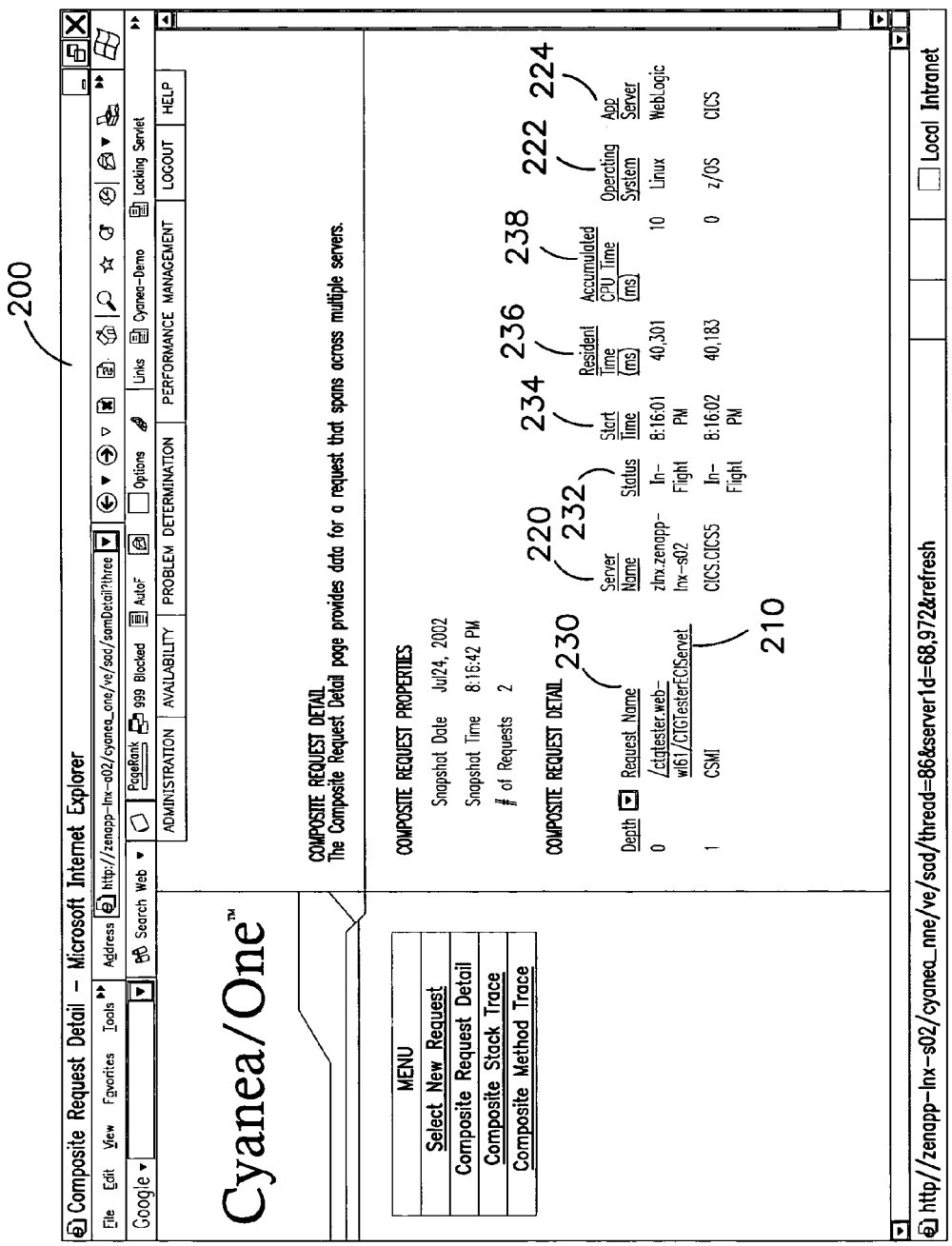
FIG. 4 is a screen shot illustrating a display for a user of a composite request screen providing additional details regarding one of the requests listed in FIG. 3.

Referring to FIG. 4, screen display 200 is shown, in which more detailed information than that provided in the display 100 is shown regarding a request being executed on multiple servers. This display is an example of a display provided at the step at block 62 of the process flow of FIG. 2A. This screen, called a composite request screen or composite request detail, provides the different names that the request has on the various servers. In this example, there are two such servers. Information provided includes information about the server, such as the server name in the column labeled 220, operating system, in the column labeled 222, and application server, in the column labeled 224, as well as information about the request on that server, such as request name, in the column labeled 230, the request status, in the column labeled 232, the request start time, in the column labeled 234, the request resident time, in the column labeled 236, and the request accumulated time, in the column labeled 238. The user has the option of drilling down to obtain additional information about an active portion of a request, such as by clicking on a link, such as at 210.

Figure 5:
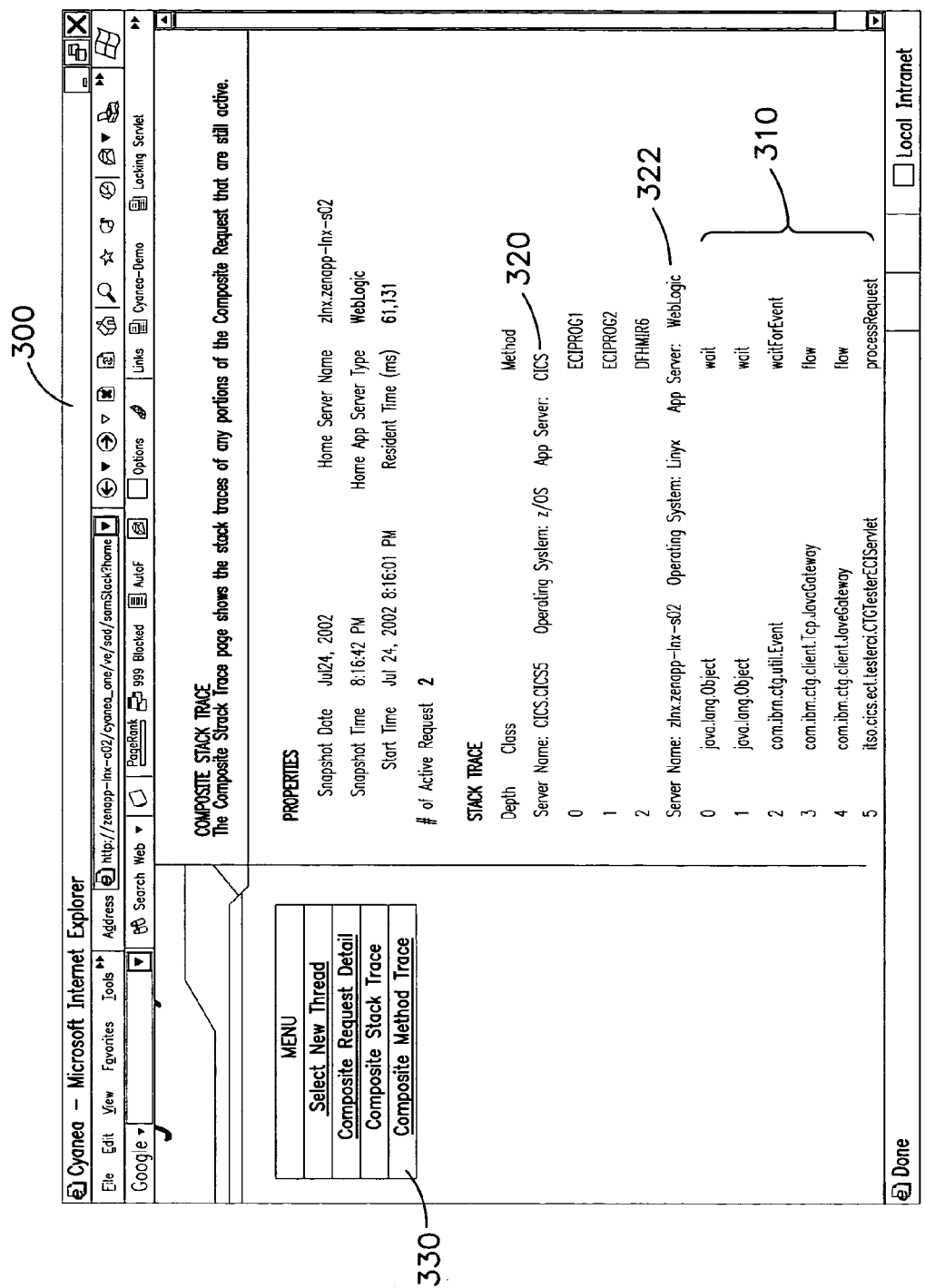
FIG. 5 is a screen shot illustrating a display for a user of a composite stack trace display, with additional information regarding portions of a composite request shown in FIG. 4.

Referring to FIG. 5, there is shown a display which may be shown at the step of block 66 of FIG. 2B. This display is composite stack trace display 300, with additional detailed information regarding portions of a composite request that are still active. This screen is obtained by user selection from the composite request screen of FIG. 4. The composite stack trace 300 displays information for all of the servers on which the request has executed. For example, those servers may be server 1 15 and server 2 15' of FIG. 1. In the example of FIG. 5, a first server is identified, at 320, as having server name CICS.CICS5, and a second server is identified, at 322, as having server name zlnx.zenap-lnx-s02. The operating system and application server program of the first server are also identified at 320. The operating system and application server program of the second server are also identified at 322. The server where the request is active, in this case the server having the server name zinx.zenapp-lnx-s02, lists the processes and their status, as shown at 310. The user can readily see which processes are active and which are inactive.

Figure 6:
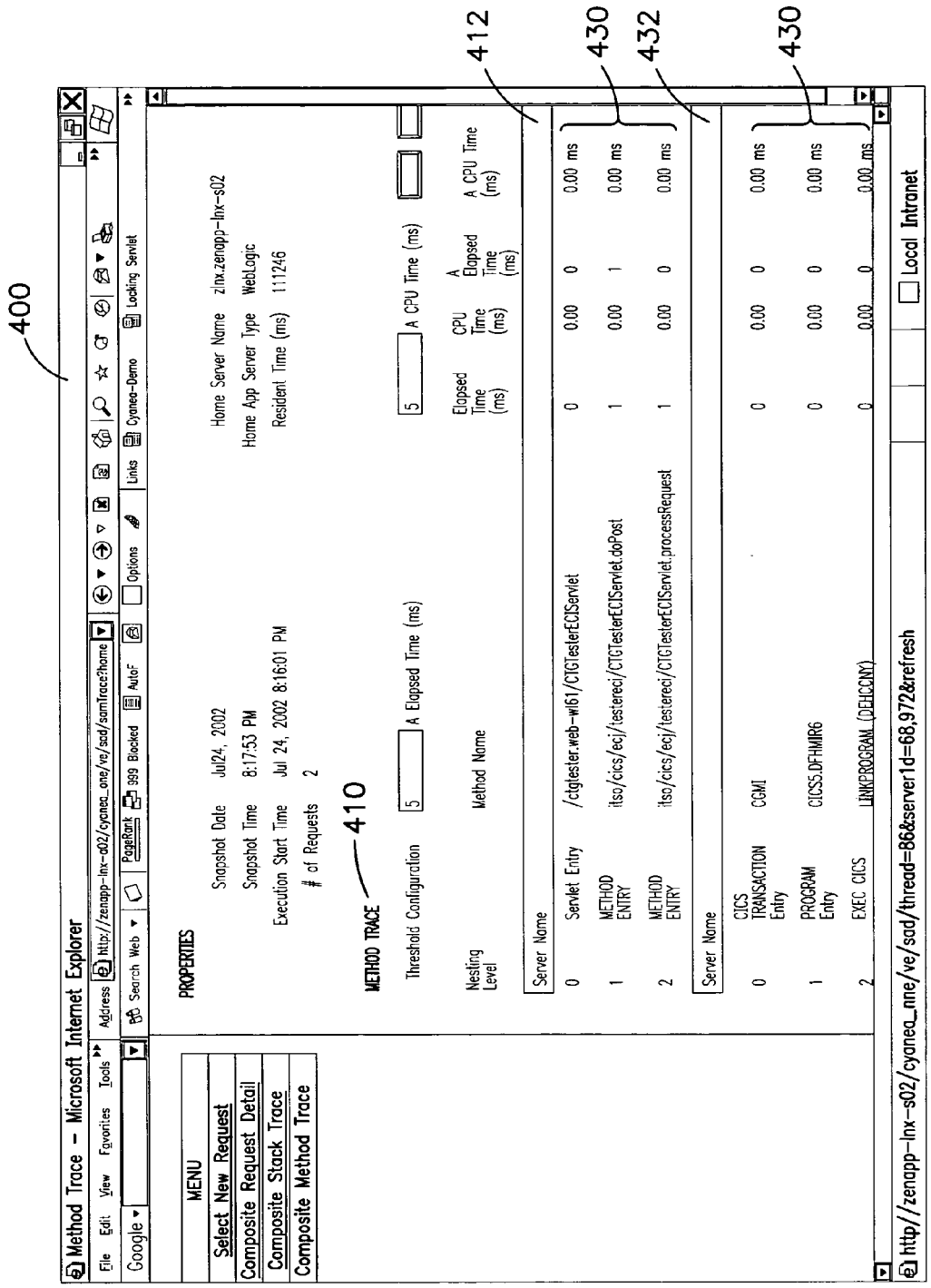
FIG. 6 is a screen shot illustrating a display for a user of a method trace screen listing each method, or equivalent, on each server on which a request shown in FIG. 5 is executed.

The user can drill down and select additional detail from the composite stack trace screen, as indicated in FIG. 2B at block 68, by selecting a composite method trace from the menu 330, which returns a method trace screen, such as the screen 400 illustrated in FIG. 6. The method trace screen 400, which may be displayed in the step at block 70 of FIG. 2B, lists each method, or equivalent, on each server on which the request is executed. In this example, the request has been executed on a Java server and a CICS server. Method trace screen lists each method on the Java server, generally at 410, and each program on the CICS server, generally at 430. Information identifying the server is shown, at 412 and 432, respectively. As to each method or program, such information as its elapsed time, CPU time, change in elapsed time, as well as the method or program name is shown. The user can readily see the status of methods and programs in multiple servers.

It will be understood that the software described below in this application, together with software from published applications nos. US-2004-0054984-A1 and US-2004-0064552-A1, and suitable computer hardware, including processors, memory, communication devices, and display devices, constitute means for accomplishing the tasks of monitoring certain information and displaying certain information for the user. It will also be understood that the software described below constitutes instructions stored on a medium, which instructions, when executed on a processor, causes the processor to execute the steps necessary to accomplish the tasks described related to monitoring of applications and furnishing and displaying to users certain information.

An exemplary architecture, in the nature of modifications to the architecture explained in prior applications will be described herein. It will be understood that the architecture and process flow described herein is merely an example of the manner in which the functionality described above may be achieved, and other architectures and process flows may be employed within the scope and spirit of the present invention.

Figure 7:
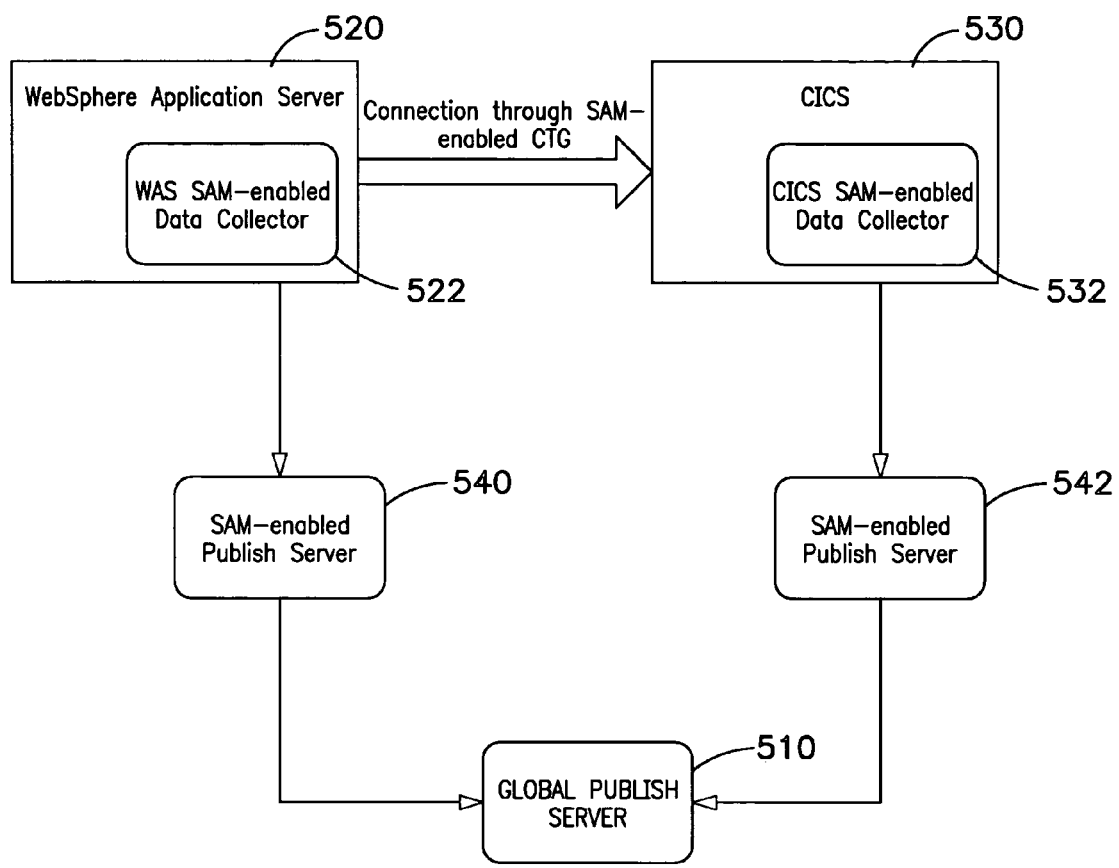
FIG. 7 is a block diagram showing major components in an exemplary architecture for obtaining information regarding requests executed on two servers.

Referring to FIG. 7, further detail regarding the monitoring software 35 is shown. Correlation information is maintained by an application called the Global Publish Server 510. This application identifies top level requests, receives information from data collectors, and maintains a database that enables tracking of requests in multiple servers. FIG. 7 is a summary overview, emphasizing the modifications to the architecture disclosed in the above-noted prior application. In this summary example, a method and system of the invention are operating on two servers, namely a WebSphere® application server 520, and a CICS application server 530. A data collector 522, configured for the WebSphere® application server, and SAM-enabled, as explained below, is collecting information from the WebSphere Application Server. Suitable data collectors are disclosed, for example, in a published U.S. Patent Application under Publication No. US-2004-0054984-AI.

Data collectors 522, 532 provide information regarding each request to M publish servers 540, 542. Publish servers 540, 542, then furnish information to global publish server 510, in addition to furnishing information to other system components. GPS 510 identifies each request with a unique identification number, which may be termed a "passport." A request identification and passport number is then furnished by the GPS to the data collectors. Information provided by the data collectors to the publish servers then includes the passport number. Information about events is correlated by passport by the GPS. All information as to current requests may be stored as an active GPS itinerary. A recent GPS itinerary may also be stored for recently-completed requests. Historical information is preferably stored in a database. The application server type is maintained in the itinerary. The itinerary information should be sufficiently complete to provide responses to user requests described and illustrated above in connection with the exemplary screen displays of FIGS. 3-6.

As illustrated in FIG. 7, a gateway between the servers 520, 530 is also SAM-enabled; in other words, passport identification information is maintained as requests are transferred across the gateway.

Figure 8:
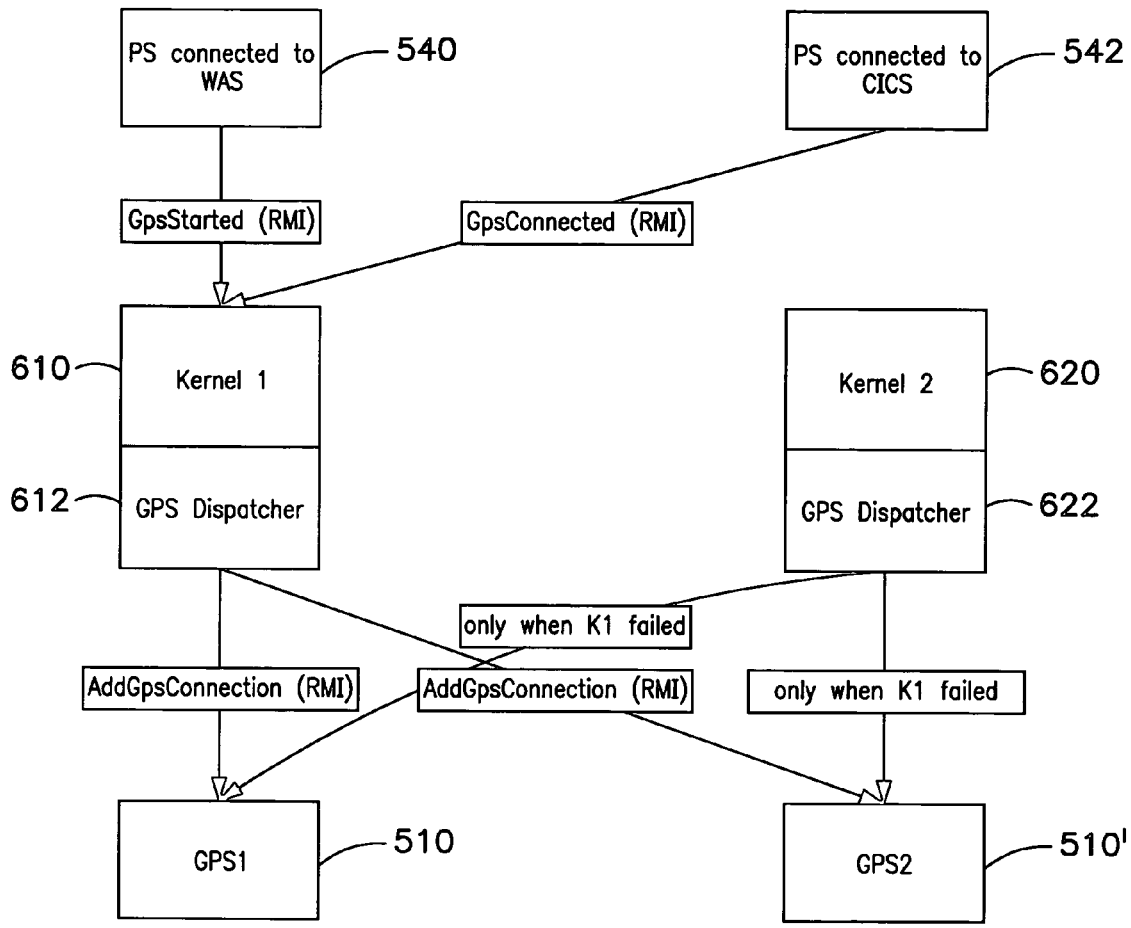
FIG. 8 is a block diagram illustrating additional features of the exemplary architecture shown in FIG. 7.

The GPS 510 receives its information through the publish servers 540, 542, and furnishes the publish servers 540, 542 with the passport number, as well as instructing the publish servers to release the related request method trace when the request is completed. For transactions identified by a passport, a numeric identifier is employed to indicate the number of connections by that transaction between servers tracked by GPS 510, as well as a parent visa number, if any. This numeric identifier is referred to as a "visa," but other terminology may be employed. For example, a first GPS tracked connection may have visa value 0, and a second connection will have visa value 1. If a transaction is called by another transaction with visa value 1, the visa of the first connection made by the called transaction has value 1-0, and the second connection made by the called transaction has value 1-1. In an exemplary embodiment, shown in FIG. 8, a GPS dispatcher is provided as part of the kernel. Publish servers 540, 542, are shown, and a publish server is provided for each monitored server (not shown in FIG. 8). Each publish server can then provide information from the probes to the GPS by updating the GPS dispatcher. In particular, the information from the probes is provided to kernel 1 610. GPS dispatcher 612, running as part of kernel 610, then furnishes the information provided by the publish servers 540, 542, to update each instance of the global publish server. The GPS Dispatcher updates each instance of the GPS. Kernel 2 620 is illustrated, as a second instance of the kernel is preferably running at all times. Second GPS dispatcher 622 is provided as part of Kernel 2. Two instances of the global publish server are also shown as 510 and 510'.

Figure 9:
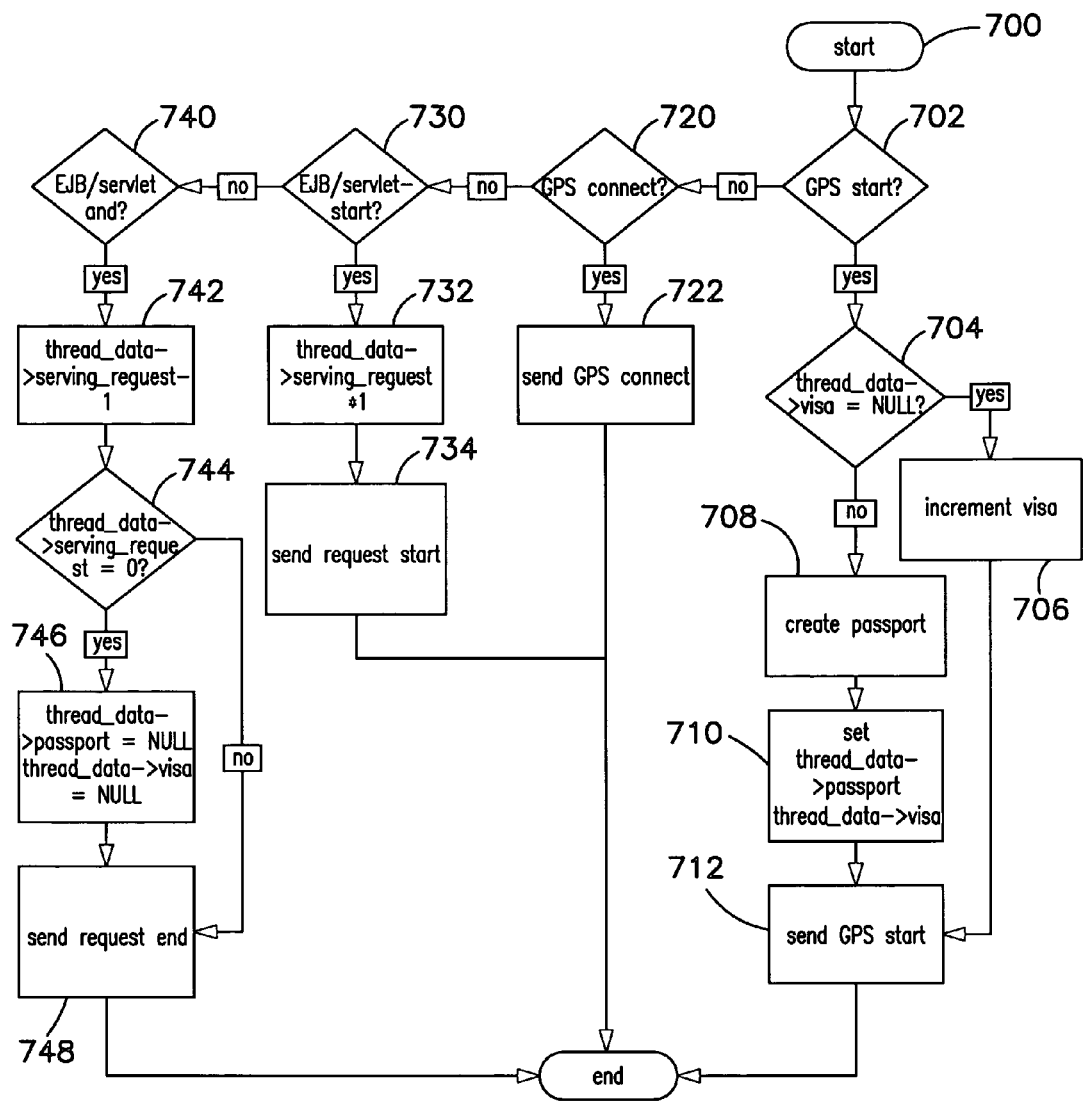
FIG. 9 is a flow diagram illustrating a process flow carried out by a publish server illustrated in FIGS. 7 and 8.

The data collector will now be discussed. The data collector, in addition to providing functionality such as that described in the above-identified published applications, inserts the GPS passport and GPS visa data into the application data conveyed by the data collector to the publish server. In addition, the data collector provides additional records. The additional records may be the GPS start record, which is sent when the managed server makes a connection to another managed server. The GPS start record contains the passport and visa information, and is furnished to the other managed server. The GPS end record is sent when the managed server disconnects from another managed server. A GPS connect record is sent when a managed server accepts a connection from another managed server. The record may contain passport, visa and component information. Referring to FIG. 9, there is shown a SAM-enabled data collector flow diagram for the sendRequest function in command_agent.C. The process flow starts at 700. For example, if there is a GPS start record, as shown at block 702, then the data collector will either create a passport, as shown at blocks 708 and 710, or, if there is already a passport, as shown at block 704, increment a visa, as shown at block 706. In either event, the GPS start data with the passport and visa data is sent to the publish server, as shown at block 712. If there is a GPS connect message, the GPS connect message is simply sent to the publish server, as indicated by blocks 720, 722. If there is an Enterprise Java Bean (EJB) or servlet Start message, the thread data serving request value is incremented, and a request start message will be sent to the publish server, as shown at blocks 730, 732, 734. If there is an EJB/servlet end message, as shown at block 740, then the thread data serving request value is decreased by 1, as shown at block 742. If the thread data serving request value is then 0, as shown at block 744, the passport and visa values are set to NULL, and the request end data is sent to the publish server, as indicated at blocks 746, 748. If the thread data serving request value is non-zero, then a request end message is sent to the publish server, without resetting the passport and visa values, as may be seen at block 744 and 748. An example of these functions is described below.

The publish server will now be described. The publish server is the bridge between the data collectors and the GPS servers. The publish server described in application number US-2004-0054984-A1 may be employed here. There are three record types not used that application, namely GPS start, GPS end and GPS connect. The processing is illustrated in the FIG. 10 flow diagram. In summary, when a GPS start record is received, if the request is not GPS tracked, then the publish server notifies the GPS (through the kernel) that a cross server application has started. The visa value may be appropriately set to indicate a root transaction.

When a request end record for the root transaction is received, then the publish server notifies the GPS (through the kernel). The publish server also notifies GPS (through the kernel) when the GPS connect record is received. This record shows the application is connected to another server. The request method trace has a GPS passport assigned and is not discarded.

Figure 10:
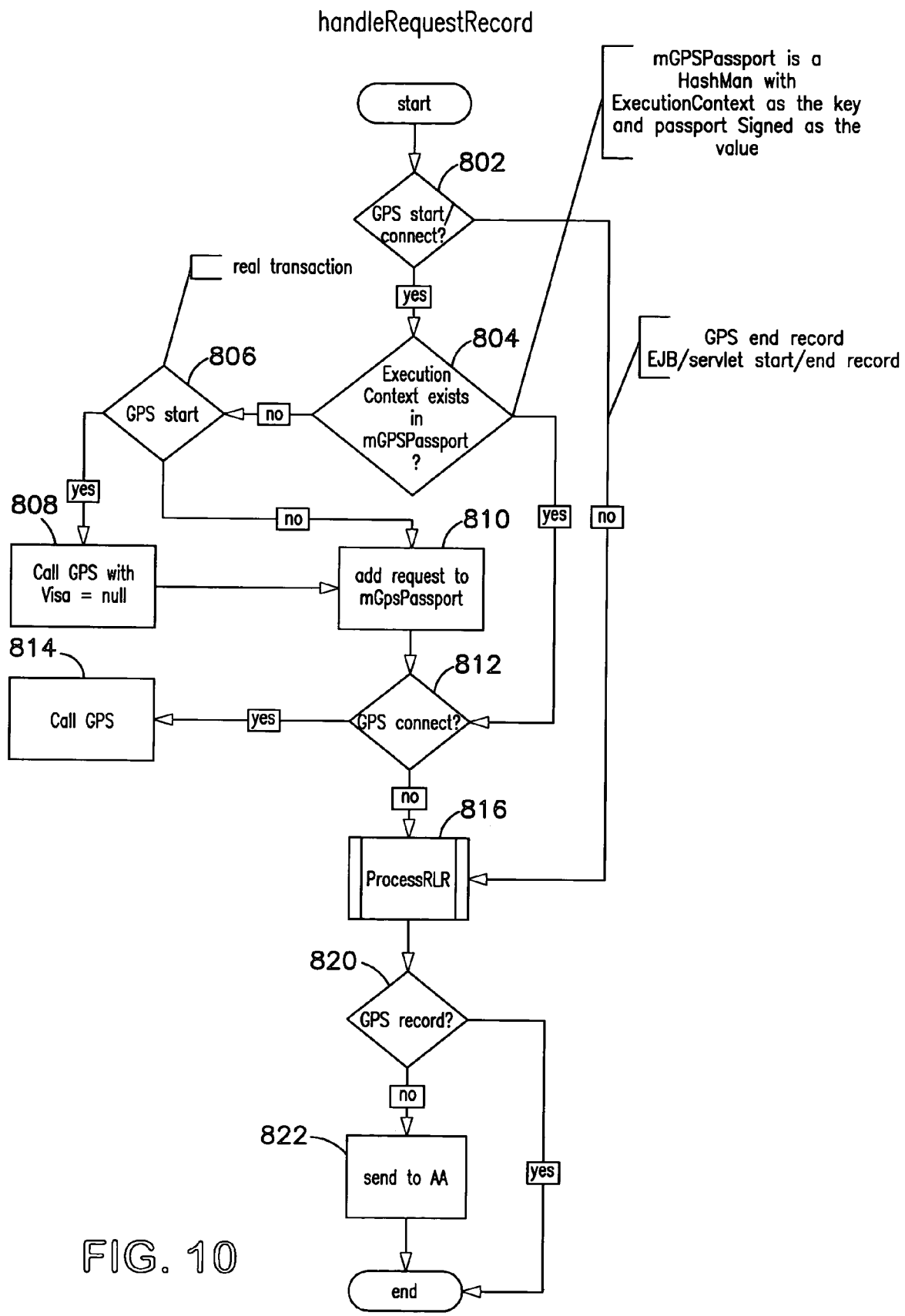
FIG. 10 is a flow diagram illustrating a process flow carried out by a publish server illustrated in FIGS. 5 and 6.

Referring specifically to FIG. 10, as shown at block 802, if a GPS start or GPS connect record is received, the next step is to determine if the execution context exists in the mGPS Passport, as shown at block 804. mGPS Passport is a hash map with Execution Context as the key and passport String as the value. If not, then processing depends on whether the record is a UPS start or GPS connect record, as shown at block 806. If the record is a GPS start record, then the UPS is called with a visa value of null, as shown at block 808 and the request is added to the mGPS Passport, as shown at block 810. If the record is a GPS connect record, the request is added to the passport, as shown at block 810, but the visa value is not set to null, and then the information is forwarded to the GPS. Similarly, if the execution context does not exist in the mGPS Passport, and the record is a UPS connect record, as shown at block 812, then the GPS is called, as shown at block 814. For all UPS start records, as shown at block 812, the processing moves to the Process RLR, at block 816, explained in more detail with respect to FIG. 11. After the ProcessRLR process is complete, if the record is not a GPS record, it is sent to the archive agent, as indicated at blocks 820, 822, and otherwise the process ends.

Figure 11:
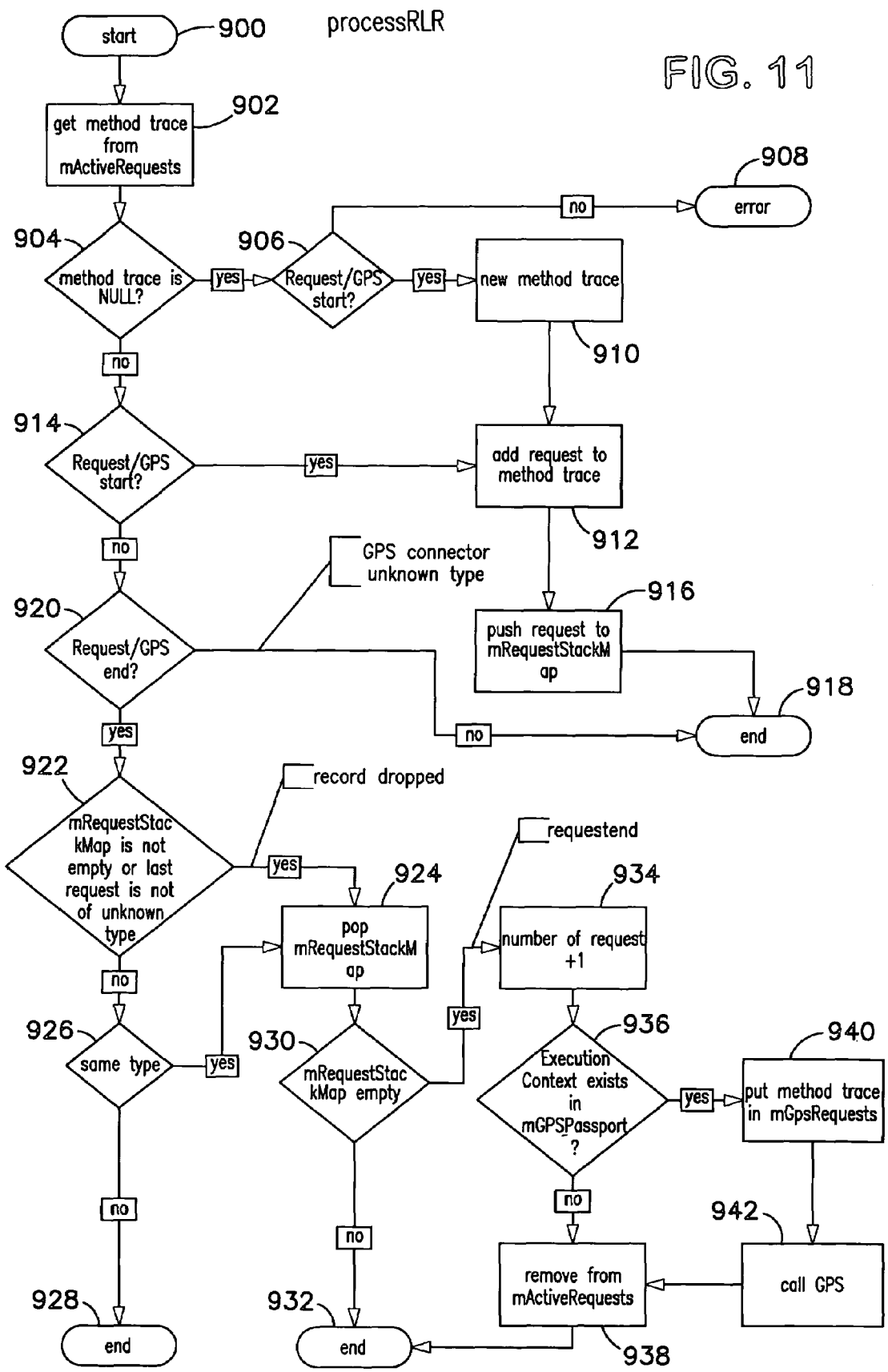
FIG. 11 is a flow diagram illustrating additional details in the process flow of FIG. 10.

In FIG. 11, the handling of method traces by the publish servers, known as processRLR, is set forth in detail. The process commences at block 900, and proceeds to obtaining method traces from the mActiveRequests, as indicated at block 902. If the method trace is NULL, then the request should be a GPS start, and any other result is an error, as indicated by blocks 904, 906 and 908. If the request is a GPS start, then a new method trace is commenced, as indicated at block 910. The request is added to the method trace, as indicated at block 912. If the method trace is not NULL, and the request is a GPS start, as indicated at blocks 904 and 914, then the request is added to the method trace at block 912. The process then proceeds to push the request to the mRequest StackMap for delivery to the GPS, as indicated at block 916.

If the method trace is not NULL, and the request is not GPS start or GPS end (i.e., either a UPS connect or an unknown record type), then the process flow ends, as indicated by blocks 920 and 918. For GPS end requests, if the mRequest Stack Map is not empty or the last request is not of an unknown type, as indicated at blocks 920 and 922, then the process flow proceeds to the function pop mRequest Stack- Map at block 924. If mRequest StackMap is empty, then the request is a request end, and the request number is incremented by 1, as indicated at blocks 930 and 934. If the request is of the same type, the process flow moves to block 924, as indicated at block 926. If the Request Stack Map is not empty, that is the end of processRLR, as indicated at blocks 930 and 932. If the Request Stack Map is empty, then the number of the request is incremented by one, as indicated at block 934. If the execution context does not exist in the GPS Passport, then the request is removed from the active requests, as indicated at blocks 936 and 938. If the execution context does exist in the GPS Passport, then the method trace is put in the GPS Requests, and the GPS is called, before the request is removed from the active requests, as indicated at blocks 940 and 942.

GPS transactions are sampled as a unit, so that accurate snapshots across servers may be obtained. The sampling rate used is that of the data collector of the first request in the GPS transaction. All related method traces are released and may be archived at the end of an application, so that the method traces may be accurately sampled. If this first request in a GPS transaction is sampled, then the GPS must inform the publish servers of the other requests in the GPS transaction to sample those other requests in the GPS transaction.

A gateway or interface between the servers carries passport and visa information between the servers. In one example, namely CICS transactions, the CICS Transaction Gateway (CTG) may be employed. The CTG is supported on a variety of operating systems, including MVS, Windows, AIX and Sun.

For active GPS transactions, the GPS maintains the complete list of transactions in the form of the GPS itinerary. For completed GPS transactions, this information is maintained in the database. In response to a request for a transactional method trace for a multi-server transaction, the GPS passport and visa for the request are employed to lookup the CORE method trace table. A table mapping between the CORE method trace table entry and the GPS passport/visa is provided.

Figure 12:
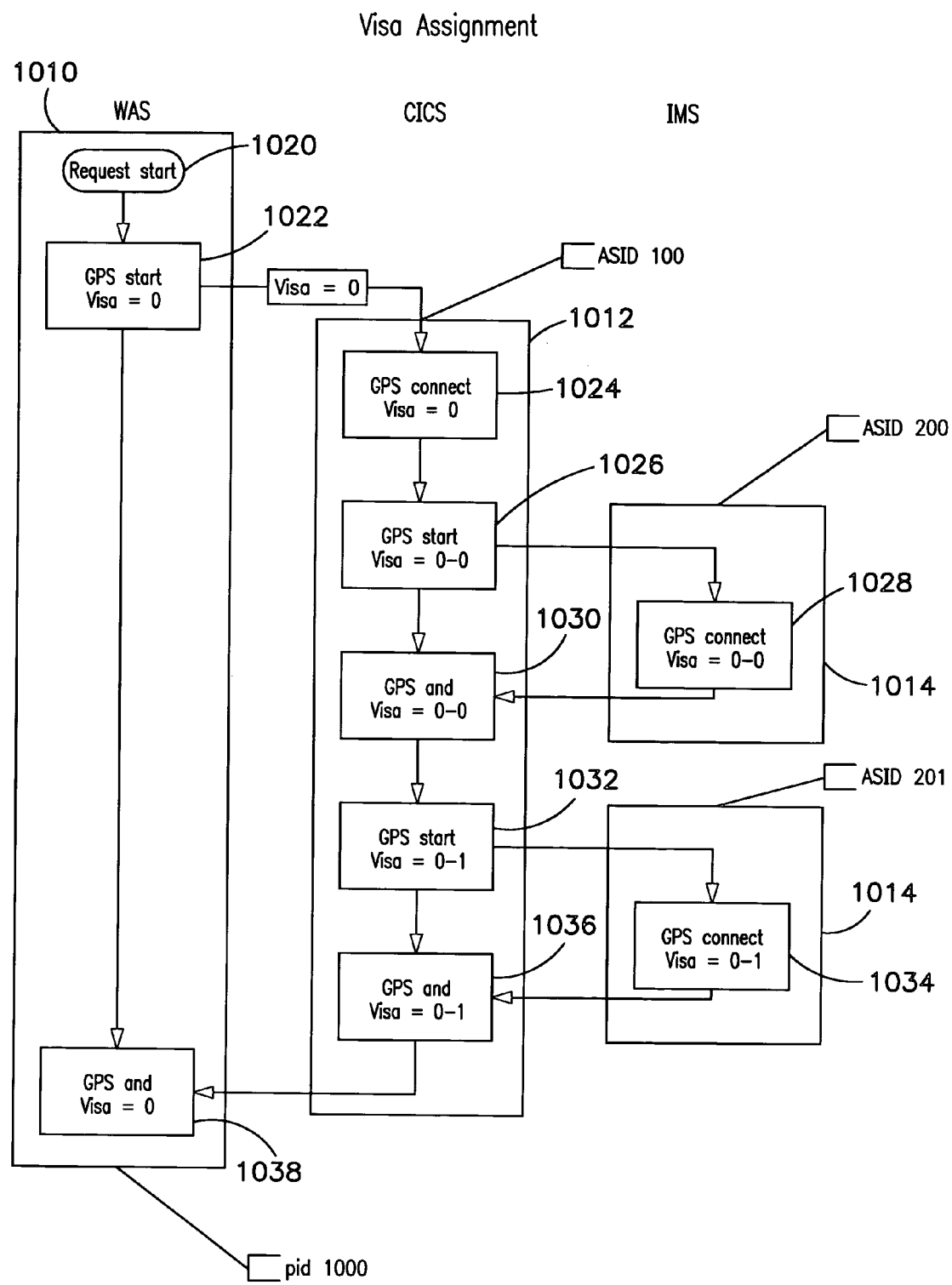
FIG. 12 is a flow diagram illustrating the process of assignment of visa values to a transaction executed by three different servers.

A passport includes particular information, which may include component identification, a process identification, thread identification and a time stamp. The component identification and process identification identify a particular server instance, and the thread identification and time stamp uniquely identify a request for that particular server. Thus, the passport identifies the server and request where the high-level request originates. A visa includes a sequence number of the GPS tracked connections. A parent visa number may also be included. FIG. 12 illustrates visa assignment for a request that is processed across three servers. In FIG. 12, the request is started on a WAS (WebSphere®) server, indicated generally at 1010, at block 1020. A GPS start record is created, and the visa value is set at zero, as indicated at block 1022. The request is passed to the CICS server 1012, a GPS connect record is created, with the visa value still "0, as indicated at block 1 024. The process flow continues to a GPS start record, with the visa value at 0-0, as indicated at block 1026. The request is passed to the IMS server 1014, and a GPS connect record is created, with Visa value of 0-0, as indicated at block 1028. The request is then passed back to the CICS server, as indicated at block 1012, and a GPS end record is created, with the visa value at 0-0, as indicated at block 1030. The request is then passed back to the IMS server, as indicated at block 1014, resulting n a GPS start record being created, and the visa value moving to 0-1, as indicated at 1032. After the request is received at the IMS server, as indicated at block 1014, a GPS connect record is created, with the visa value remaining at 0-1, as indicated at block 1034. The request is then passed back to the CICS server, and a GPS end record is created, with the visa value remaining at 0-1, as indicated at block 1036. The request is then finally passed back to the WAS server, as indicated at block 1010, with a GPS end record being created, and, as the request is on the originating server, the visa value going to 0, as indicated at block 1038. It will be understood that the process described in FIG. 12 is merely exemplary.

An example of a GPS itinerary is shown in FIG. 13, as table 1100. In the passport column 1102, exemplary passport numbers are shown. Each row, such as row 1104, identifies a request. The requests on rows 1104 and 1106 have been processed on the identified WAS server. The request on row 1105 is the same as the request on row 1104, and has been passed to the identified CICS server. The passport number is a key to looking up all transactions associated with a particular request. The other columns are server attributes, which are the CID at column 1108, PID at column 1110, and TID at column 1112 associated with the server, the server type at column 1116, and the visa number associated with the server at column 1118, as well as at least the CID of the publish server associated with the server, at column 1114. The GPS itinerary table may also contain request name, request start time, and CPU clock associated with the request.

The GPS interfaces include interfaces called when a GPS tracked request is completed so that the GPS can gather information in the request. A publish server notifies the GPS when a new GPS tracked connection is made or when the GPS tracked application is finished. The GPS dispatcher calls the GPS to release all tracked method traces in the publish servers at that time. An array list of all active tracked connections or all recent tracked connections, identified by passport, may be requested from the publish servers. The GPS can then reconstruct the multi-server method trace corresponding to the passport based on method trace from each publish server. The GPS may instruct the publish server to hold the method trace for a particular passport, which is appropriate for an unfinished transaction.

Figure 14:
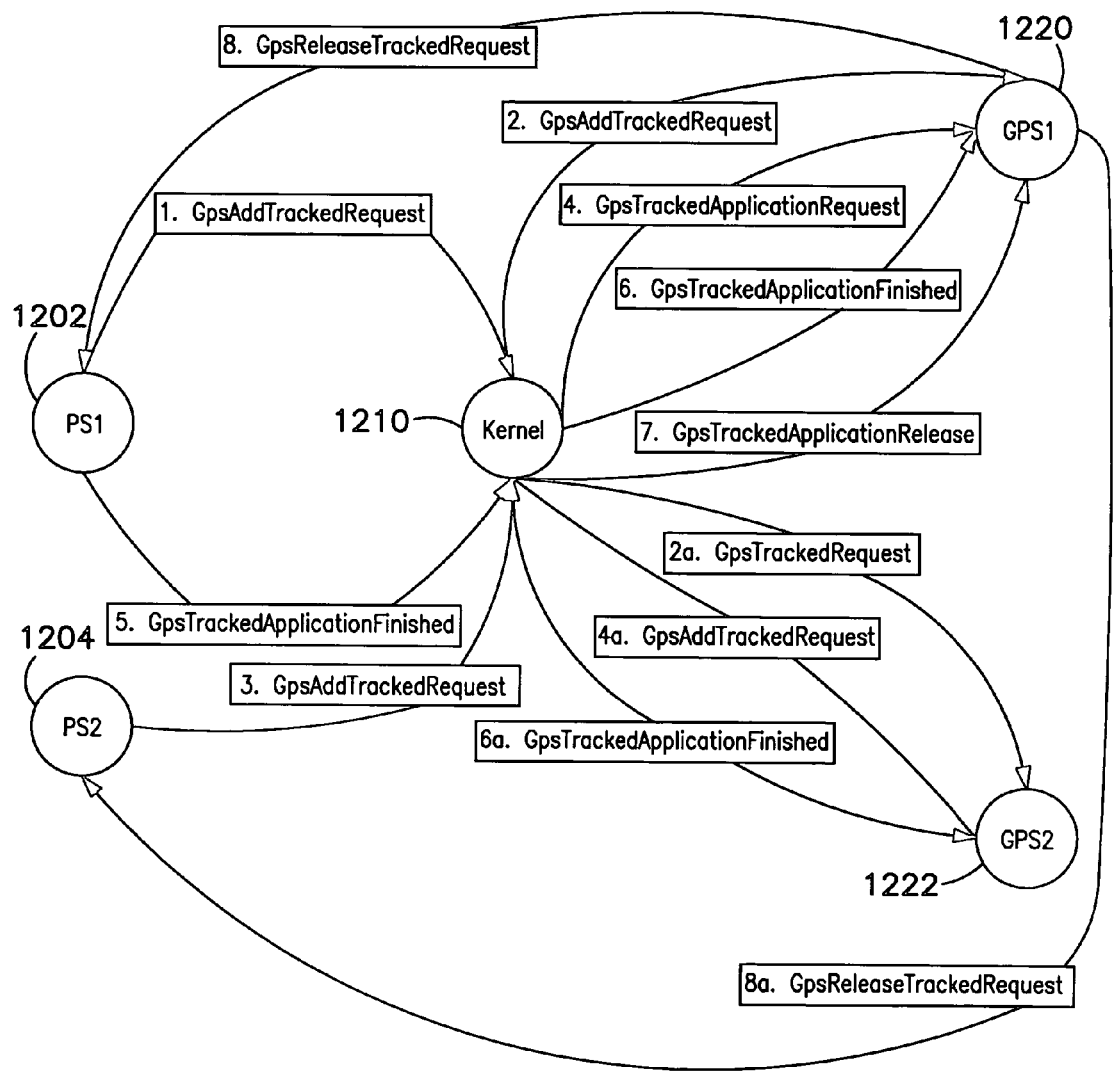
FIG. 14 is a diagram illustrating the process flow in an exemplary architecture of the invention.

Referring to FIG. 14, a flow chart of the GPS functionality is provided. In this example, there are two servers; only one instance of the kernel is illustrated. Initially, a new multi-server application is detected running on a first server, by publish server 1 at 1202, and is reported to the kernel 1210 by a GPSAddTrackedRequest. The kernel 1210 forwards the information to all running GPSes, and the GPS itinerary is updated. Publish server 2 1204 reports to the kernel 1210 that the same transaction is tracked on a second server monitored by publish server 2 1204. The kernel 1210 forwards the update to all GPSes. Publish server 1 1202 reports to the kernel 1210 that the root transaction is completed, and the kernel notifies all GPSes 1220, 1222. One GPS, GPS 1220 in this example then calls both publish server 1 1202 and publish server 2 1204 to release all method traces pertaining to the transaction. It will be understood that this process may be carried out with more than two publish servers, and with more than two GPSes.

Figure 15:
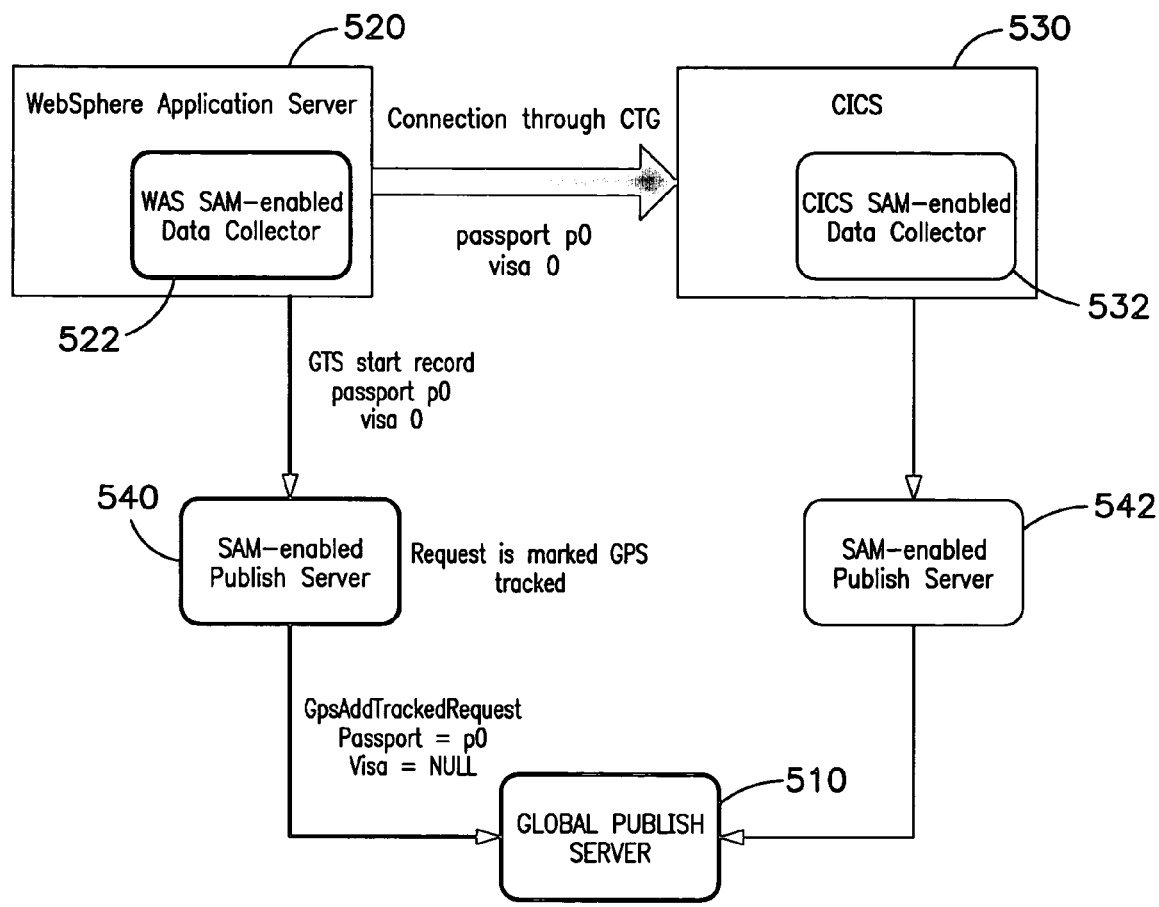
FIG. 15 is a block diagram illustrating a step in a process flow as carried out in an exemplary architecture.

A sample workflow will now be explained. It will be understood that this example of a workflow is merely illustrative, and that many other workflows are possible within the scope of the present invention. The components are the same as those illustrated in FIG. 7, and therefore the number from FIG. 7 will be used here. In this example, a servlet updates an account which requires the use of a CICS-based application. The servlet operates on a WebSphere Application server. Referring to FIG. 15, initially, the WebSphere server 520 connects to the CICS server 530 through a CTG. A CORE request start record and a GPS start record are sent by the data collector 522 to the publish server 540 for the WebSphere server 520. The record has passport value p0 and visa value 0. The visa is 0, as this is the first transaction for this passport. The publish server 540 notifies the GPS 510 of the request and the passport number by calling GpsAddTrackedRequest. The visa value is NULL, as this is the root transaction. In this illustration, the kernel is not shown. The thick lines in FIG. 15 show the active components in this step. It will be understood that, in the exemplary architecture, the publish server notifies the kernel, which in turn notifies the GPSes.

Figure 16:
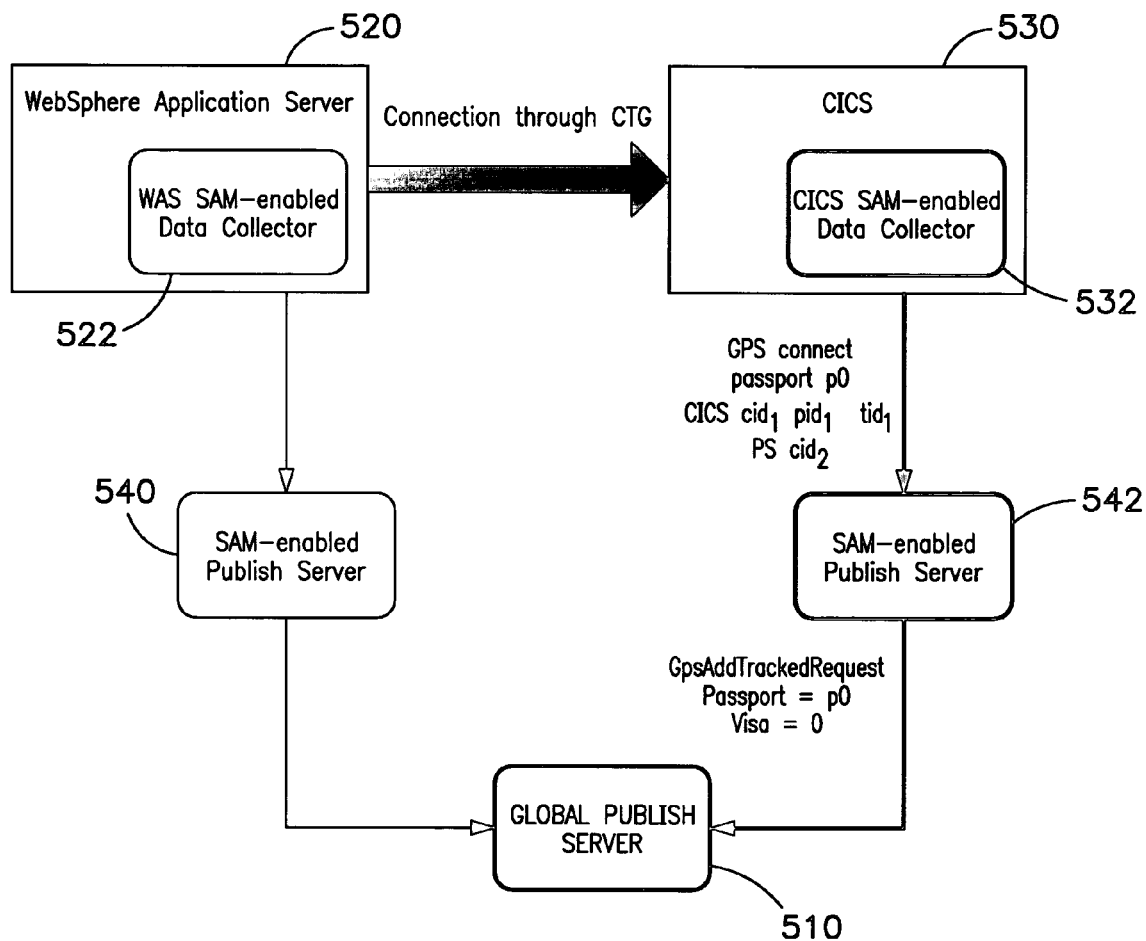
FIG. 16 is a block diagram illustrating a step subsequent to that of FIG. 15.

Referring to FIG. 16, in the next step in the process flow of FIG. 15, the CICS server 530 has accepted the connection from the WebSphere server 520. Data collector 532 on the CICS server 530 sends a CORE request start record and a GPS connect record to the publish server 542 associated with the CICS server. The information provided includes the passport number, server information, including CICS CID, PID, and TID, and the publish server CID. The publish server 542 notifies the GPS 510 by providing the passport number, with a visa value of 0. The GPS can correlate the information from the two publish servers using the passport number.

Figure 17:
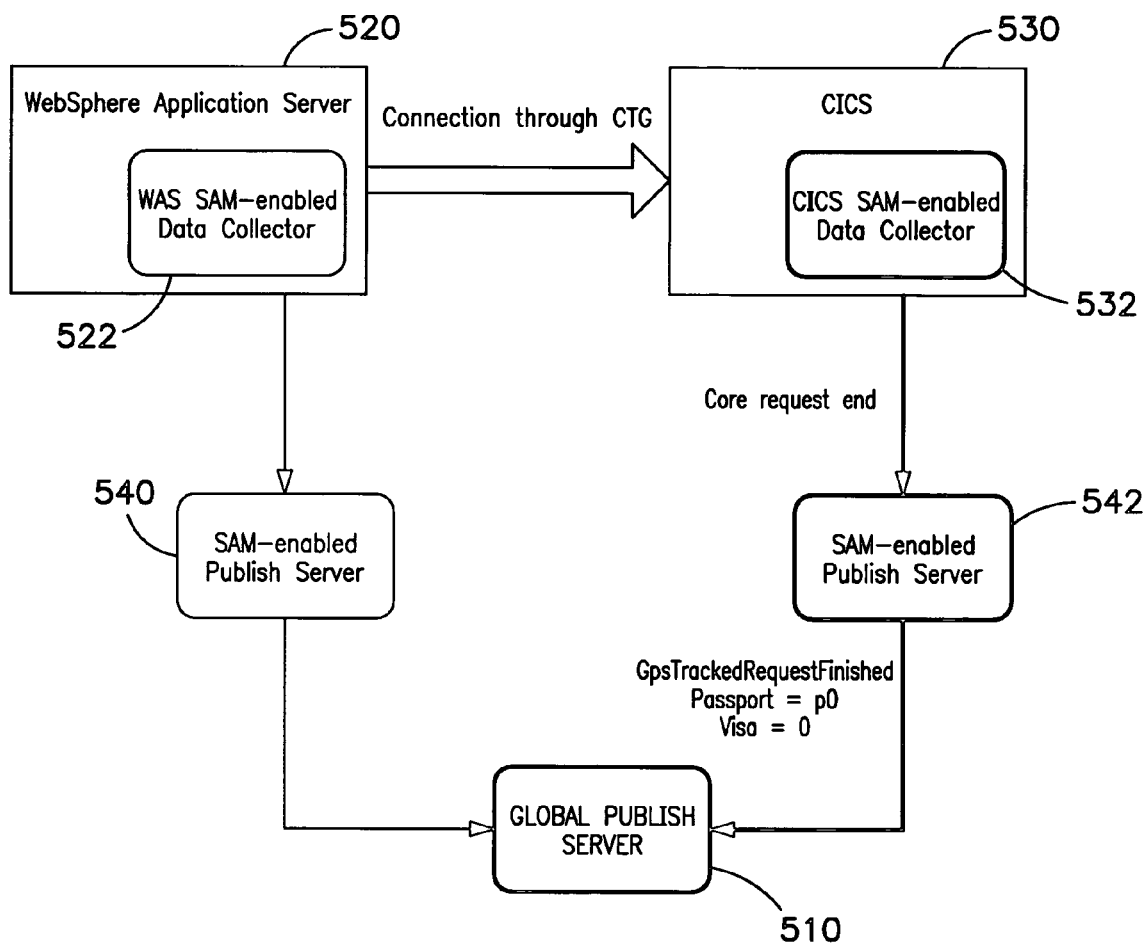
FIG. 17 is a block diagram illustrating a step subsequent to that of FIG. 16.

Referring to FIG. 17, in the next step in the process flow, the portion of the transaction executed on the CICS server is now completed. The data collector 532 on the CICS server 530 reports to the associated publish server 542 using a CORE request end record, which includes passport information. The publish server 542 notifies GPS 510 that the request is completed on the CICS server. In particular, the publish server 542 calls GpsTrackedRequestFinished to notify GPS 510 that the request is completed. The GPS 510 updates its itinerary with relevant data, such as CPU time used for the request, and elapsed time for the request, as to the CICS server.

Figure 18:
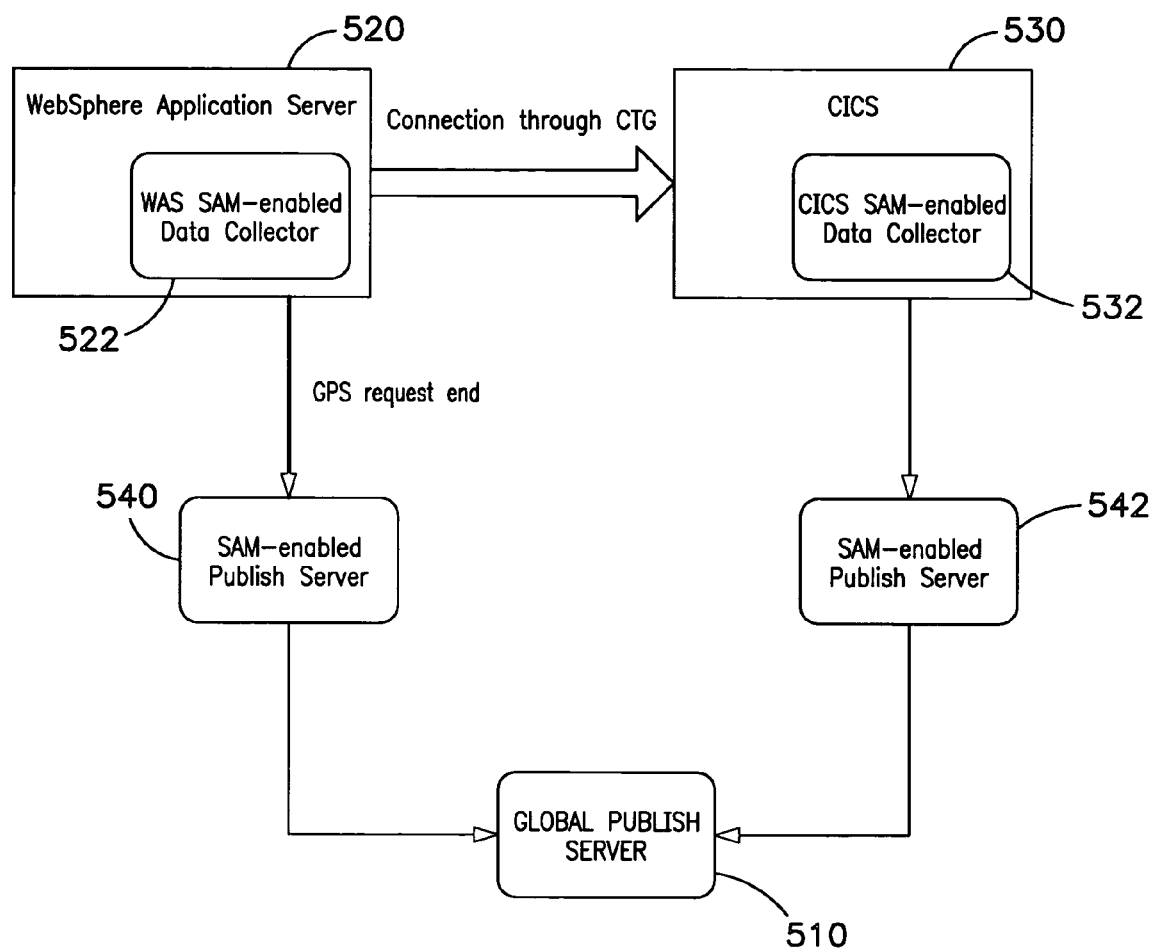
FIG. 18 is a block diagram illustrating a step subsequent to that of FIG. 17.

Referring to FIG. 18, in the next step of the process flow, the connection between the WebSphere server 520 and the CICS server 530 as to this transaction or request is illustrated. The data collector 522 on the WebSphere server 520 sends a GPS request end record, including passport information to the publish server 540 associated with the WebSphere server. The publish server does not need to notify the GPS 510 of the disconnection until the request has been completed. The GPS start and end records are maintained in the method trace for reconstruction of the transactional method trace.

Figure 19:
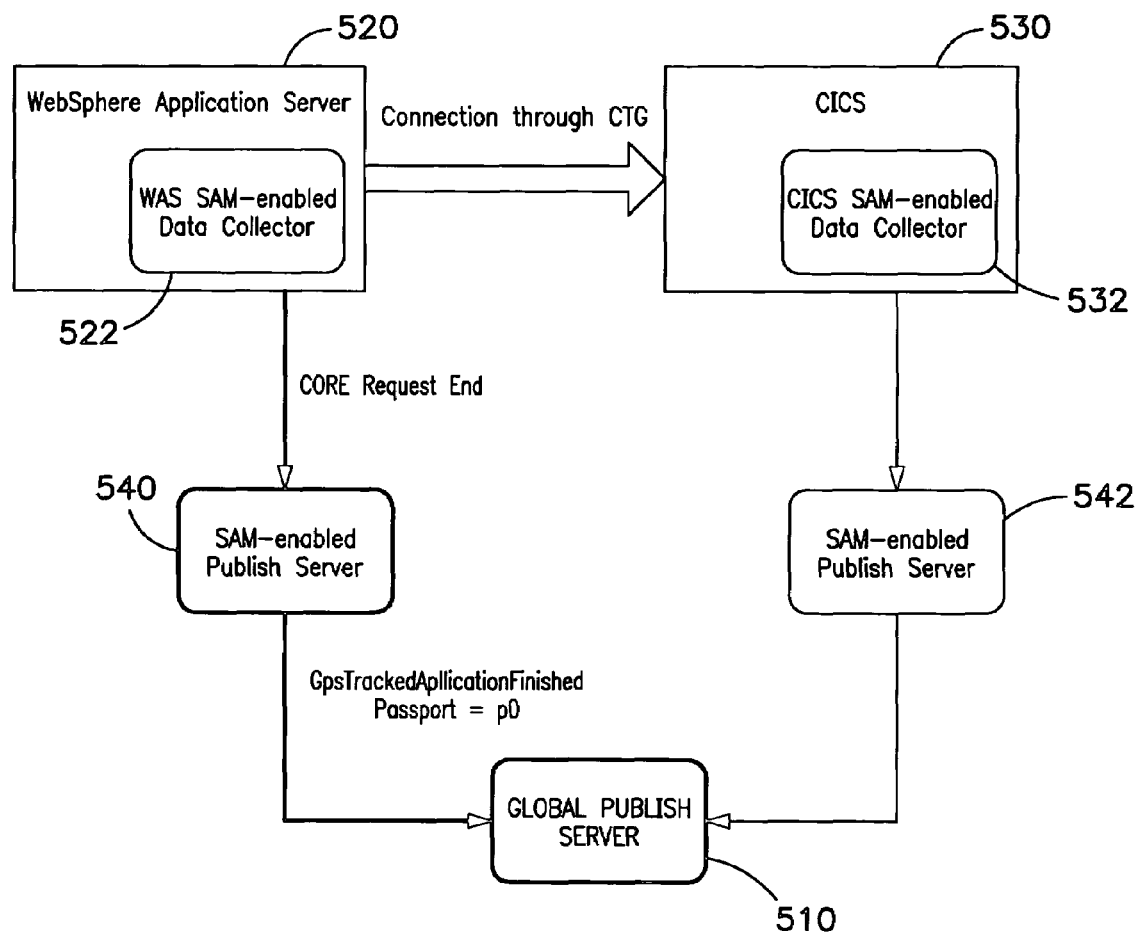
FIG. 19 is a block diagram illustrating a final step in the process flow of FIGS. 15 to 18.

Referring to FIG. 19, in the final step of the illustrated process flow, the underlying transaction has been completed. The data collector 522 on the WebSphere server sends a CORE request end record to the associated publish server 540. The publish server 540 notifies GPS 510 that the transaction is completed. Publish server 540 may send this information by calling GpsTrackedApplicationFinished The GPS 510 then transfers all records with the associated passport number to the Recent GPS itinerary, and calls both publish servers to release the related method traces.

Figure 20:
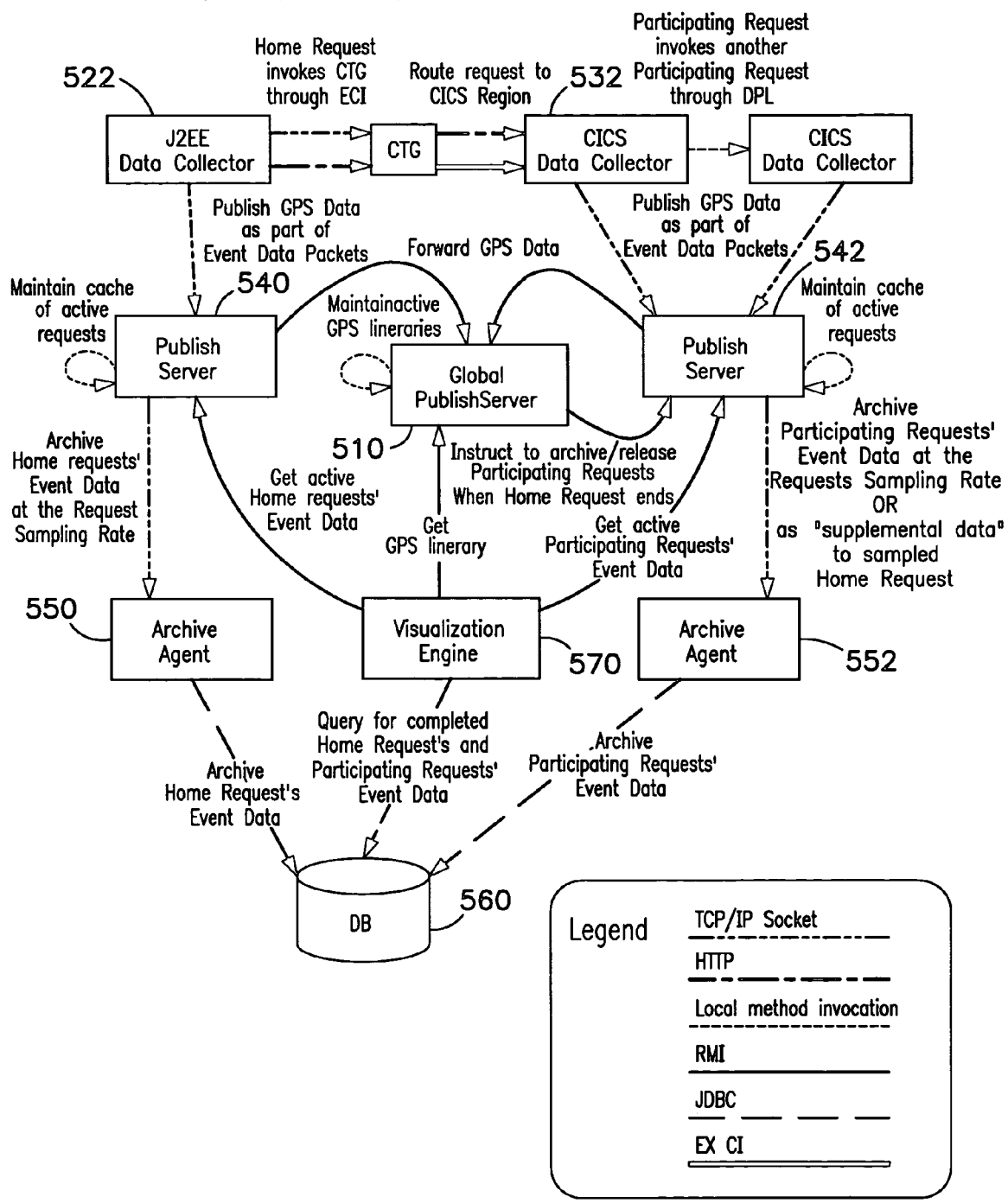
FIG. 20 is a block diagram illustrating features of an exemplary architecture in a system in accordance with the invention.

Additional features of an exemplary architecture that may be used with the method of the invention may be understood with reference to FIG. 20. In FIG. 20, the monitored servers and the kernel are not shown. It will be understood that FIG. 20 is an example of requests performed on both a Java server and a CICS server, although the invention is not limited to two servers or to Java and CICS. In particular, it can be seen from FIG. 20 that each publish server 540, 542, archives event data to an associated archive agent 550, 552. This occurs at the request sampling rate for data provided by the initiating request server, but either at the request sampling rate or as supplemental data to the initial request when obtained from the publish server of the second server. The archive agents then provide their data to the database 560.

Continuing to refer to FIG. 20, the visualization engine 570 furnishes information in response to a user request. When rendering composite request detail pages and composite method trace pages for active composite requests, the visualization engine first obtains itinerary information from the GPS. Based on the itinerary information, the visualization engine 570 then identifies the publish servers that maintain the required information about the active composite requests, and then obtains the information as to active composite requests from each publish server 540, 542. However, if the composite request is completed, the visualization engine 570 obtains the information from the database 560. In the database, only the initial request may be identified as having been part of a composite request. However, the other requests can be obtained as they are correlated with the initial request in the database.

Referring further to FIG. 20, exemplary communications protocols that may be employed are illustrated. For example, the data collectors 522, 532 employ TCP/IP socket protocols to furnish information to publish servers 540, 542. Data collectors 522, 532 publish GPS data to publish servers as part of event data packets which the data collectors customarily furnish to the publish servers. The data collector on the Java server connects to the CTG through a TCP/IP socket and through an HTTP protocol. The CTG routes the request to the CICS region using an HTTP protocol and EXCI. On a single server, a participating request can invoke another request through DPL, using a local method invocation. Publish servers 540, 542, maintain internal caches of active requests using local method invocation. The publish servers 540, 542 forward GPS data to global publish server 510 using RMI. Global publish server 510 maintains active GPS itineraries internally using local method invocation. GPS 510 sends instructions to publish servers to archive or release participating requests when the home request ends using RMI. Publish servers 540, 542 send home request and participating request event data at the request sampling rate to archive agents 540, 542, using a TCP/IP socket protocol. Publish server 542, which in this example is associated with a server which is not the request's home server, can send, to archive agent 552, the participating request's event data as supplemental data to any sampled home request. Visualization engine 570 uses RMI to get active home request's event data from publish server 540, to get active participating requests' event data from publish server 542, and to get the GPS itinerary from GPS 510. Archive agent 550 uses JDBC to send home request event data to database 560. Archive agent 552 also uses JDBC to send participating request event data to database 560. Visualization engine 570 queries database 560 for completed home request and participating request event data using JDBC.

The method, system and computer program of the invention enables a user to track a transaction through from start to finish, even when the transaction involves multiple servers. The user can better diagnose sources of problems in execution of transactions, and can more readily analyze requirements, such as needs for additional capacity.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

While the exemplary embodiments have been described with respect to enterprise applications using Java technologies, and specifically J2EE technologies, the methods of the invention may be implemented in other technologies. For example, the methods of the invention may be implemented in other platform-independent technologies. The methods of the invention may also be implemented in other technologies applicable to distributed enterprise applications.

While the invention has been described with reference to preferred embodiments, the invention should not be regarded as limited to preferred embodiments.

What is claimed is:

1. A method for providing information regarding at least one request executed on a first server and a second server, comprising:

monitoring of a first application running on said first server and a second application running on said second server;

identifying at least one request executed on both said first server and said second server, wherein said at least one identified request is received at said first server from a client, wherein said at least one identified request has an identifier, and, wherein, when said at least one identified request is passed between said first server and said second server, said identifier is passed with said at least one identified request;

displaying information concerning said at least one identified request, wherein information as to said at least one identified request processed on said first server and said second server is correlated, wherein a designation is displayed for said at least one identified request that is executed on both said first server and said second server, wherein a thread identifier is displayed for said at least one identified request;

receiving a user query to drill down in the information to obtain more detailed information about said at least one identified request by receiving selection of said thread identifier of a particular request;

in response to said user query, displaying said more detailed information that includes different names that said particular request has on said first server and said second server;

receiving user selection of a link displayed in said more detailed information; and in response to said user selection of the link, displaying additional detailed information that includes a composite stack trace with information for said first server and said second server on which said particular request has executed and includes processes that correspond to said at least one identified request, wherein the processes are identified as active or inactive.

2. The method of claim 1, wherein said step of displaying comprises displaying said information on a single display.

3. The method of claim 1, further comprising displaying, in response to said user selection of the link, at least one process on said first server associated with said particular request and at least one process on said second server associated with said particular request.

4. The method of claim 3, further comprising:

receiving a user query to drill down further in the additional detailed information by receiving selection of a composite method trace; and in response to said user query to drill down further, displaying methods on said first server and said second server corresponding to said particular request.

5. The method of claim 1, further comprising associating said identifier with said at least one identified request.

6. The method of claim 5, wherein, when said at least one identified request is passed between said first server and said second server, said identifier and associated information is furnished by a data collector to a managing server.

7. The method of claim 1, further comprising:

receiving criteria from a user for selecting said at least one request, wherein the criteria permits selection of a group of servers and individual servers within said group, and wherein leaving a field identifying a request empty results in a display of active requests.

8. The method of claim 1, further comprising:

providing real time and historical information.

9. A system for providing information regarding at least one request executed on a first server and a second server, comprising:

means for monitoring of a first application running on said first server and a second application running on said second server;

means for identifying at least one request executed on both said first server and said second server, wherein said at least one identified request is received at said first server from a client, wherein said at least one identified request has an identifier, and, wherein, when said at least one identified request is passed between said first server and said second server, said identifier is passed with said at least one identified request;

means for displaying information concerning said at least one identified request, wherein information as to said at least one identified request processed on said first server and said second server is correlated, wherein a designation is displayed for said at least one identified request that is executed on both said first server and said second server, wherein a thread identifier is displayed for said at least one identified request;

means for receiving a user query to drill down in the information to obtain more detailed information about said at least one identified request by receiving selection of said thread identifier of a particular request;

means for, in response to said user query, displaying said more detailed information that includes different names that said particular request has on said first server and said second server;

means for receiving user selection of a link displayed in said more detailed information; and means for, in response to said user selection of the link, displaying additional detailed information that includes a composite stack trace with information for said first server and said second server on which said particular request has executed and includes processes that correspond to said at least one identified request, wherein the processes are identified as active or inactive.

10. The system of claim 9, wherein said means for displaying comprises means for displaying said information on a single display.

11. The system of claim 9, further comprising means for displaying, in response to said user selection of the link, at least one process on said first server associated with said particular request and at least one process on said second server associated with said particular request.

12. The system of claim 11, further comprising:
means for receiving a user query to drill down further in the additional detailed information by receiving selection of a composite method trace; and
means for, in response to said user query to drill down further, displaying methods on said first server and said second server corresponding to said particular request.

13. The system of claim 9, comprising means for associating said identifier with said at least one identified request.

14. The system of claim 13, comprising means for, when said at least one identified request is passed between said first server and said second server, said identifier and associated information is furnished by a data collector to a managing server.

15. The system of claim 9, further comprising:
means for receiving criteria from a user for selecting said at least one request, wherein the criteria permits selection of a group of servers and individual servers within said group, and wherein leaving a field identifying a request empty results in a display of active requests.

16. The method of claim 9, further comprising:
means for providing real time and historical information.

17. A computer program stored on a computer readable storage medium for providing information regarding at least one request executed on a first server and a second server, said program consisting of instructions stored on a medium, said instructions, when executed on a processor causing the processor to execute:
monitoring of a first application running on said first server and a second application running on said second server;
identifying at least one request executed on both said first server and said second server, wherein said at least one identified request is received at said first server from a client, wherein said at least one identified request has an identifier, and, wherein, when said at least one identified request is passed between said first server and said second server, said identifier is passed with said at least one identified request;
displaying information concerning said at least one identified request, wherein information as to said at least one identified request processed on said first server and said second server is correlated, wherein a designation is displayed for said at least one identified request that is executed on both said first server and said second server, wherein a thread identifier is displayed for said at least one identified request;
receiving a user query to drill down in the information to obtain more detailed information about said at least one identified request by receiving selection of said thread identifier of a particular request;
in response to said user query, displaying said more detailed information that includes different names that said particular request has on said first server and said second server;
receiving user selection of a link displayed in said more detailed information; and
in response to said user selection of the link, displaying additional detailed information that includes a composite stack trace with information for said first server and said second server on which said particular request has executed and includes processes that correspond to said at least one identified request, wherein the processes are identified as active or inactive.

18. The computer program of claim 17, wherein displaying comprises displaying said information on a single display.

19. The computer program of claim 17, further comprising displaying, in response to said user selection of the link, at least one process on said first server associated with said particular request and at least one process on said second server associated with said particular request.

20. The computer program of claim 19, further comprising:
receiving a user query to drill down further in the additional detailed information by receiving selection of a composite method trace; and
in response to said user query to drill down further, displaying methods on said first server and said second server corresponding to said particular request.

21. The computer program of claim 17, further comprising associating said identifier with said at least one identified request.

22. The computer program of claim 21, wherein, when said at least one identified request is passed between said first server and said second server, said identifier and associated information is furnished by a data collector to a managing server.

23. The computer program of claim 17, further comprising:
receiving criteria from a user for selecting said at least one request, wherein the criteria permits selection of a group of servers and individual servers within said group, and wherein leaving a field identifying a request empty results in a display of active requests.

24. The computer program of claim 17, further comprising:
providing real time and historical information.

* * * * *